US007006472B1

(12) United States Patent
Immonen et al.

(10) Patent No.: US 7,006,472 B1
(45) Date of Patent: Feb. 28, 2006

(54) METHOD AND SYSTEM FOR SUPPORTING THE QUALITY OF SERVICE IN WIRELESS NETWORKS

(75) Inventors: Jukka Immonen, Espoo (FI); Juha Ala-Laurila, Tampere (FI); Tom Söderlund, Helsinki (FI); Jouni Mikkonen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/763,885

(22) PCT Filed: Aug. 27, 1999

(86) PCT No.: PCT/EP99/07718

§ 371 (c)(1),
(2), (4) Date: Oct. 15, 2001

(87) PCT Pub. No.: WO00/13436

PCT Pub. Date: Mar. 9, 2000

(30) Foreign Application Priority Data

Aug. 28, 1998 (GB) .................................... 9818873
Sep. 1, 1998 (GB) .................................... 9819175

(51) Int. Cl.
*H04J 3/14* (2006.01)
(52) U.S. Cl. ..................................... 370/332; 455/405

(58) Field of Classification Search ............. 370/230.1, 370/310.1, 310.2, 328–329, 332, 338, 341, 370/347, 349, 351–352, 395.1, 431, 465, 370/468; 455/403, 426, 450, 452.2, 509, 455/513, 556, 408, 426.1, 556.1; 725/91, 725/133

See application file for complete search history.

(56) References Cited

U.S. PATENT DOCUMENTS

| 6,157,614 A | * | 12/2000 | Pasternak et al. ........... 370/236 |
| 6,452,915 B1 | * | 9/2002 | Jorgensen ................... 370/338 |
| 6,597,682 B1 | * | 7/2003 | Kari ........................... 370/348 |
| 2002/0067706 A1 | * | 6/2002 | Bautz et al. ................. 370/331 |

FOREIGN PATENT DOCUMENTS

| JP | 8154097 A | 6/1996 |
| WO | WO 98/53576 | 11/1998 |

* cited by examiner

*Primary Examiner*—Wellington Chin
*Assistant Examiner*—John Shew
(74) *Attorney, Agent, or Firm*—G. Peter Albert, Jr.; Foley & Lardner, LLP

(57) ABSTRACT

A mechanism is provided for supporting differentiated services (quality of service) in a radio network. A radio access system is provided which supports the quality of service in data packet transmission over its air interface. The system comprises a selection of predefined default radio flows having different quality of service characteristics and means (4, 52) for selecting a radio flow having appropriate quality of service characteristics for the packet to be transmitted over the air interface from the selection.

36 Claims, 18 Drawing Sheets

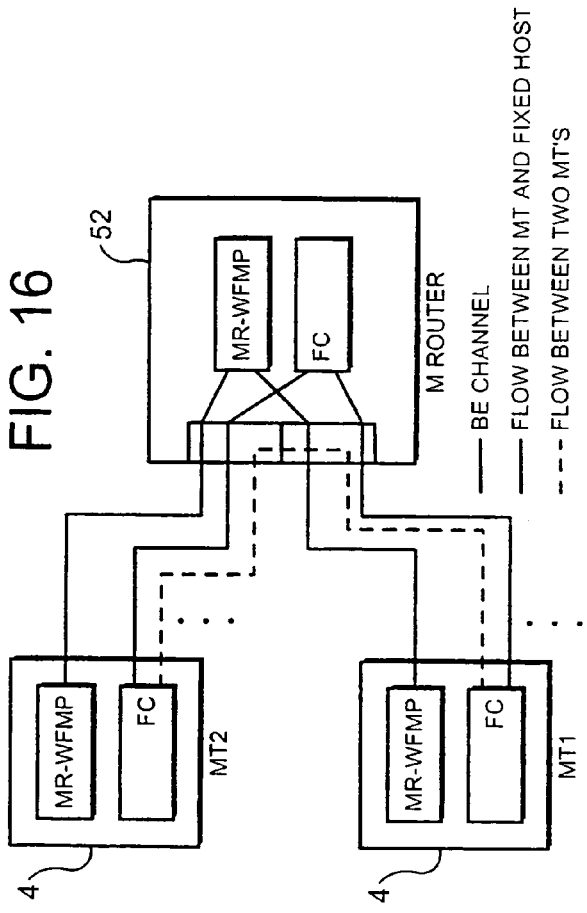

METHOD AND SYSTEM FOR SUPPORTING THE QUALITY OF SERVICE IN WIRELESS NETWORKS

The present invention relates to a mechanism for supporting the quality of service in radio networks. In particular, it relates to a method, system and communication devices which support the quality of service in packet data transmission in a radio network.

Such a mechanism is required, for example, in wireless internet protocol (IP) networks.

The term "Internet" is commonly used to describe an information resource from which information can be retrieved from a data processor, such as a personal computer (PC). The data processor communicates via a modem with a telecommunication network. This information resource is distributed worldwide, comprising several storage locations which also communicate with the telecommunication network. The Internet is made operable by defining certain data communication standards and protocols, such as TCP (transfer control protocol), UPD (user datagram protocol), and IP (Internet protocol), which are used for controlling data transmission between numerous parts of the Internet. The TCP and the UDP are involved with preventing and correcting data transmission errors in the data transmitted in the Internet; the IP is involved in packet addressing and routing. The currently specified versions of the Internet protocol are IPv4 and IPv6. IPv4 is defined in RFC791 and IPv6 is defined in RFC1883.

Thanks to the growing popularity of open data systems, the Transmission Control Protocol/Internet Protocol (TCP/IP) communication protocol has become a generally used protocol whereby computers of different sizes and brands can communicate with each other. TCP/IP support is currently available for almost all operating systems. The network layer protocol of TCP/IP, the Internet Protocol IP, is intended to be used for packet routing by gateways, i.e. routers. The routing is conducted by means of IP addresses of four bytes and routing tables. Thanks to the Internet protocol, computers using the TCP/IP can transfer messages in the routing network even to the other side of the world.

The rapid evolution of the Internet services has created a strong need for broadband networks with high data rate and Quality of Service (QoS). Video broadcasting and other multimedia distribution services are evolving rapidly. The users are willing to access these services also in the wireless environment. Currently, in the fixed IP network, IP packets are typically sent as best effort data traffic. In the case of network congestion, all data streams are handled with equal priority which may have a dramatic effect on multimedia services. Two main problems exist: firstly the current wireless networks will not provide sufficient QoS mechanism, and secondly, the existing wireless networks are not capable of serving several simultaneous connections with high data rate and QoS requirements. To meet the increased customer requirements, new wireless broadband network techniques are required.

The Internet Engineering Task Force (IETF) is an organisation involved with the development of internet architecture and operation in the internet. They have defined two different IP based QoS concepts: integrated and differentiated services, for providing a standard mechanism for supporting real time applications in IP networks. Integrated services is based on an abstract flow model with reservation protocol (RSVP, RFC2205) and admission control. The network reserves statically resources for real time connections in each network device, and hence is not optimally efficient. Consequently the differentiated services concept was developed. This concept is based on the use of an IP header for indicating the requested service class for the packet. As a result, each IP packet header carries QoS information and no static reservations are required. Whilst the IETF suggest the use of an IP header for indicating the QoS, the actual packet handling mechanisms will not be standardised.

The present invention provides a wireless IP network architecture which supports QoS, and in particular differentiated services in the air interface.

According to a first aspect of the present invention, there is provided a method for supporting the quality of service in packet data transmission in a radio network, whereby transmission over the air interface is in radio flows, the method comprising selecting a radio flow having appropriate quality of service characteristics for the packet to be transmitted over the air interface from a selection of predefined default radio flows having different quality of service characteristics.

The provision of default radio flows enables the radio network to support differentiated services, and thus cater for wireless broadband services. In particular, it prevents bottlenecking of data in the radio part of an IP network.

Radio flow selection may be effected by providing the packet to be transmitted with a radio flow identifier selected from predefined default radio flow identifiers representative of different quality of service characteristics. The packet may then be mapped into the identified default radio flow for transmission over the air interface.

Advantageously, the method comprises detecting handover of a mobile communications device having an active connection from one radio subnetwork to another and performing default radio flow selection for the active connection in response to handover detection.

This further improves inter-domain mobility. For example, as a mobile terminal moves into a new radio subnetwork (e.g. the area of a new mobile router), the default radio flows can be utilised for improving the performance of the handover. The new router will typically have no information of the terminal connections and requested QoS. Therefore, it cannot establish QoS flows in advance. In order to reduce packet losses during the handover, the terminal and network can temporarily switch the existing connections ("old flows") into one of the default radio flows. This approach allows the assignment of a higher QoS for certain connections until the new router detects QoS (IP) flows and switches the connections into separate radio flows.

Preferably, the method also supports integrated services. For example, in a preferred embodiment of the invention, the method further comprises monitoring packets to be transmitted over the air interface to detect IP flows, and switching a detected IP flow to a dedicated radio flow having corresponding quality of service characteristics. Typically, a default radio flow will initially be selected, and then an IP flow will be transferred to a separate radio flow once that radio flow is set up.

Switching the detected IP flow to a dedicated radio flow may be effected by providing the packets of a detected IP flow with an identifier of the dedicated radio flow, and mapping the packets of the detected IP flow into the identified dedicated radio flow for transmission over the air interface.

A system and communication devices are provided which implement the aforementioned method.

For example, according to another aspect of the present invention, there is provided a radio access system for supporting the quality of service in data packet transmission over the air interface, the system comprising a selection of predefined default radio flows having different quality of service characteristics, and means for selecting a radio flow having appropriate quality of service characteristics for the packet to be transmitted over the air interface from the selection.

The radio flow selecting means optionally comprises means for providing the packet to be transmitted with a radio flow identifier selected from identifiers corresponding to the predefined default radio flows and means for mapping the packet into the identified default radio flow for transmission over the air interface.

Also, the system preferably comprises means for detecting handover of a mobile communications device having an active connection from one radio subnetwork to another. In this event, the selection means selects a default radio flow for the active connection in response to handover detection.

Advantageously, the system further comprises means for monitoring packets to be transmitted over the air interface to detect IP flows, and means for switching a detected IP flow to a dedicated radio flow having corresponding quality of service characteristics. The switching means may comprise means for providing the packets of a detected IP flow with an identifier of the dedicated radio flow, and means for mapping the packets of the detected IP flow into the identified dedicated radio flow for transmission over the air interface.

According to a further aspect of the present invention, there is provided a communication device for use in a system which supports the quality of service in data packet transmission over the air interface and comprises a selection of predefined default radio flows having different quality of service characteristics, wherein the device is arranged to select a default radio flow having appropriate quality of service characteristics for the packet to be transmitted over the air interface from the selection. The communication device may, for example be a mobile communication device, an access point controller or a mobile router.

According to an embodiment of the invention a radio modem provides a few different service types, which enables the radio network to support differentiated services, and thus cater for wireless broadband services. In particular, it prevents bottle-necking of time-critical data in the radio part of the Internet access network. The selection of the radio QoS class may be effected by defining the IP type of service bits, —i.e. diffs. bits and selecting the corresponding predefined default radio QoS class. The packet may then be mapped into the identified default radio queue for transmission over the air interface.

The transmission over the air interface can be based e.g. on radio flows, the method comprising selecting a radio flow having appropriate quality of service characteristics for the packet to be transmitted over the air interface from a selection of predefined default radio flows having different quality of service characteristics. Alternatively, the system may utilise several radio level service queues with different scheduling priorities.

As mentioned above, the presented method comprises detecting handover of a mobile communications device having an active connection from one radio subnetwork to another and performing default radio flow selection for the active connection in response to handover detection.

This further improves inter-domain mobility. In such an embodiment of the invention, the new router can immediately notice the required type of service by reading the IP header of the incoming packets. Consequently, the real-time data can be directly mapped to the highest service class queues which will reduce packet losses during the handover. If default radio flows are used this approach allows the assignment of a higher QoS for certain connections until the new router detects QoS (IP) flows and switches the connections into separate radio flows.

Preferably, the method of this embodiment also supports integrated services. For example, the method may further comprise monitoring packets to be transmitted over the air interface to detect IP flows, and switching a detected IP flow to a dedicated radio service queue having corresponding quality of service characteristics.

According to another embodiment of the present invention, there is provided a radio access system for supporting the quality of service in data packet transmission over the air interface, the system comprising a selection of predefined default radio service queues. The different queues will be scheduled differently in the air interface. The packets belonging to a certain queue may be transmitted over the air interface either by using a specific radio flow identifier or alternatively different service queues may be scheduled differently but sent without any flow specific identifier. The radio queues having different quality of service characteristics, provide means for selecting a radio service class which corresponds to the network level, e.g. IP, QoS class for the packet to be transmitted over the air interface from the selection.

The system of this embodiment may comprise means for detecting handover of a mobile communications device having an active connection from one radio subnetwork to another. In this event, the selection means selects an appropriate radio QoS class, i.e. scheduling queue and/or radio flow for the active connection in response to handover detection.

Embodiments of the present invention will now be described, by way of example, with reference to the accompanying drawings, of which:

Figure 4:
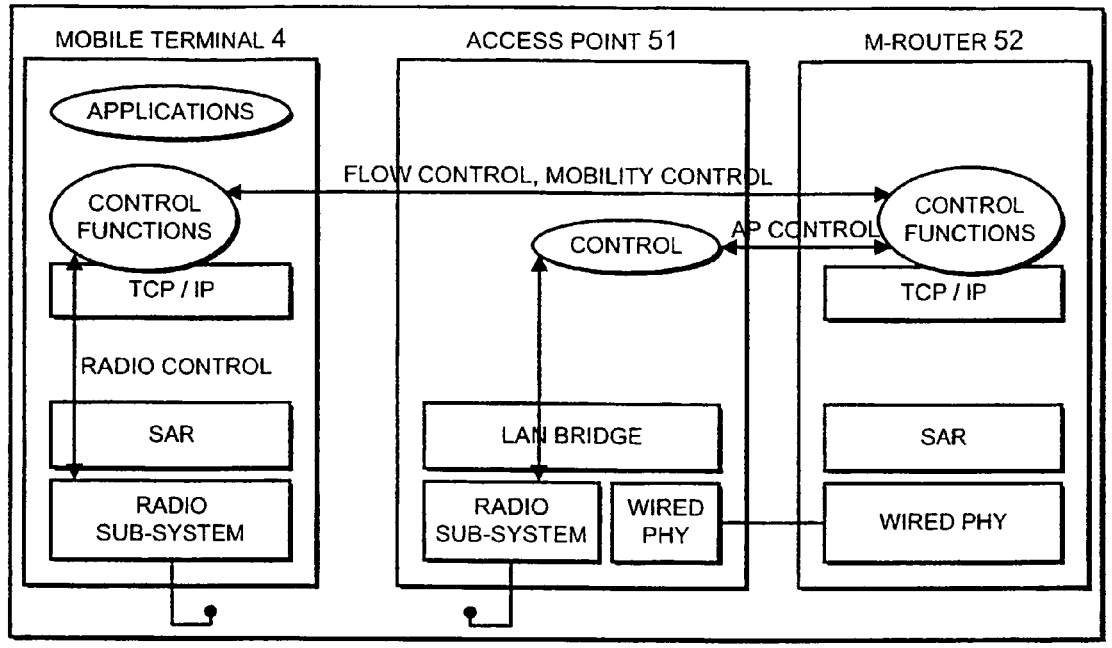
Figure 5:
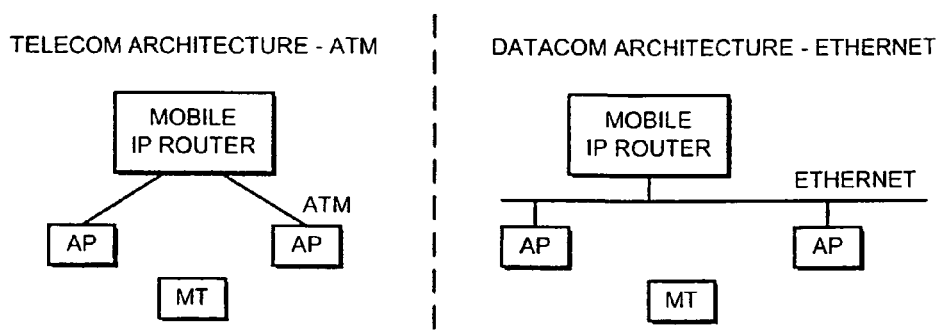
Figure 6:
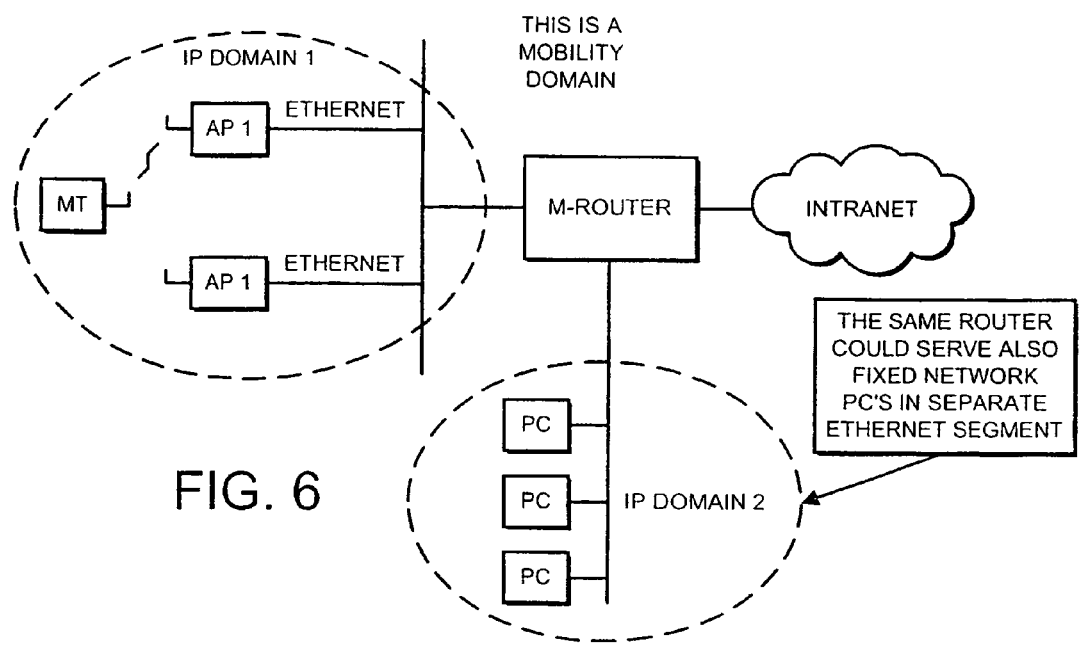
Figure 7:
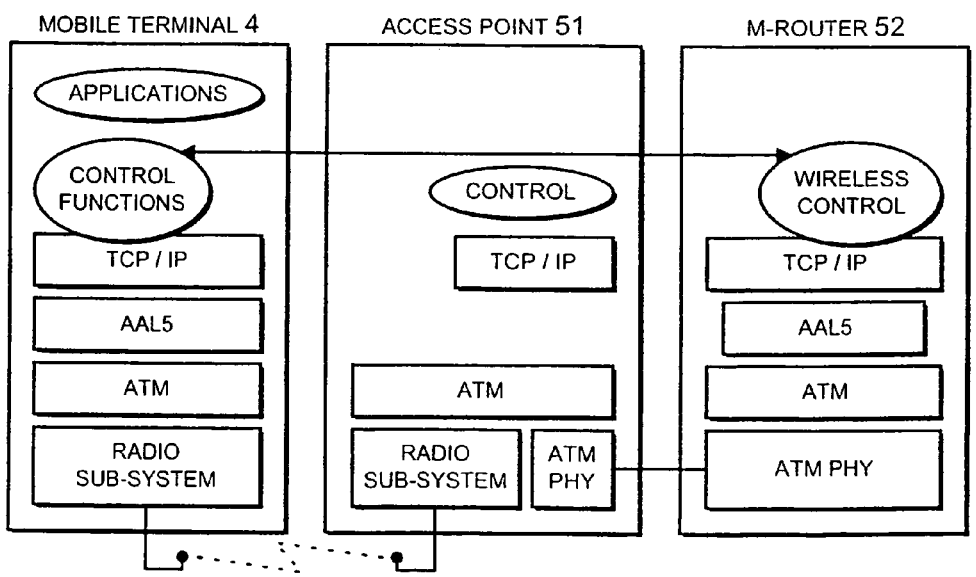
Figure 8:
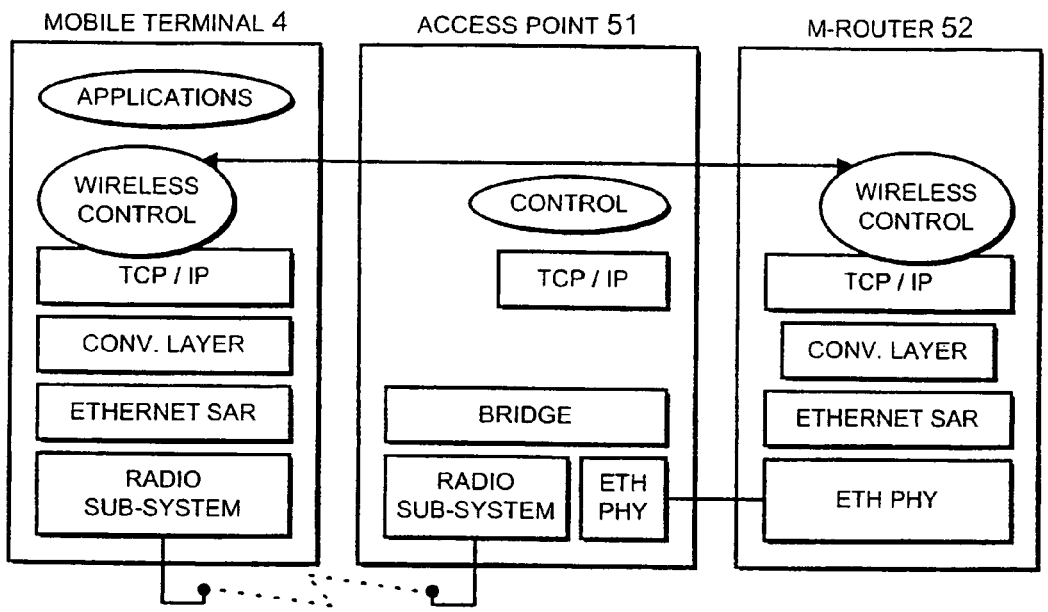
Figure 9:
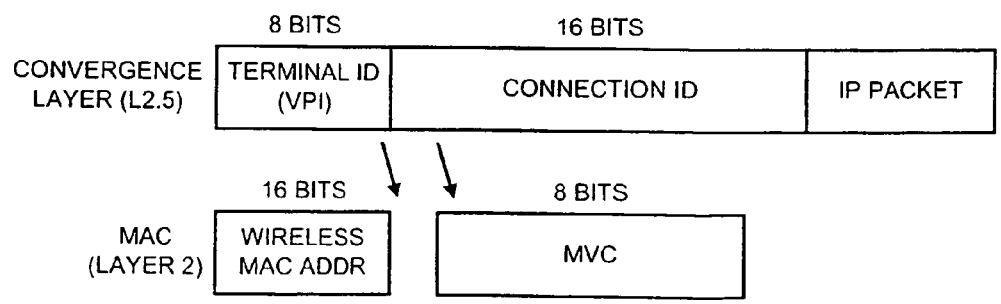
Figure 10:
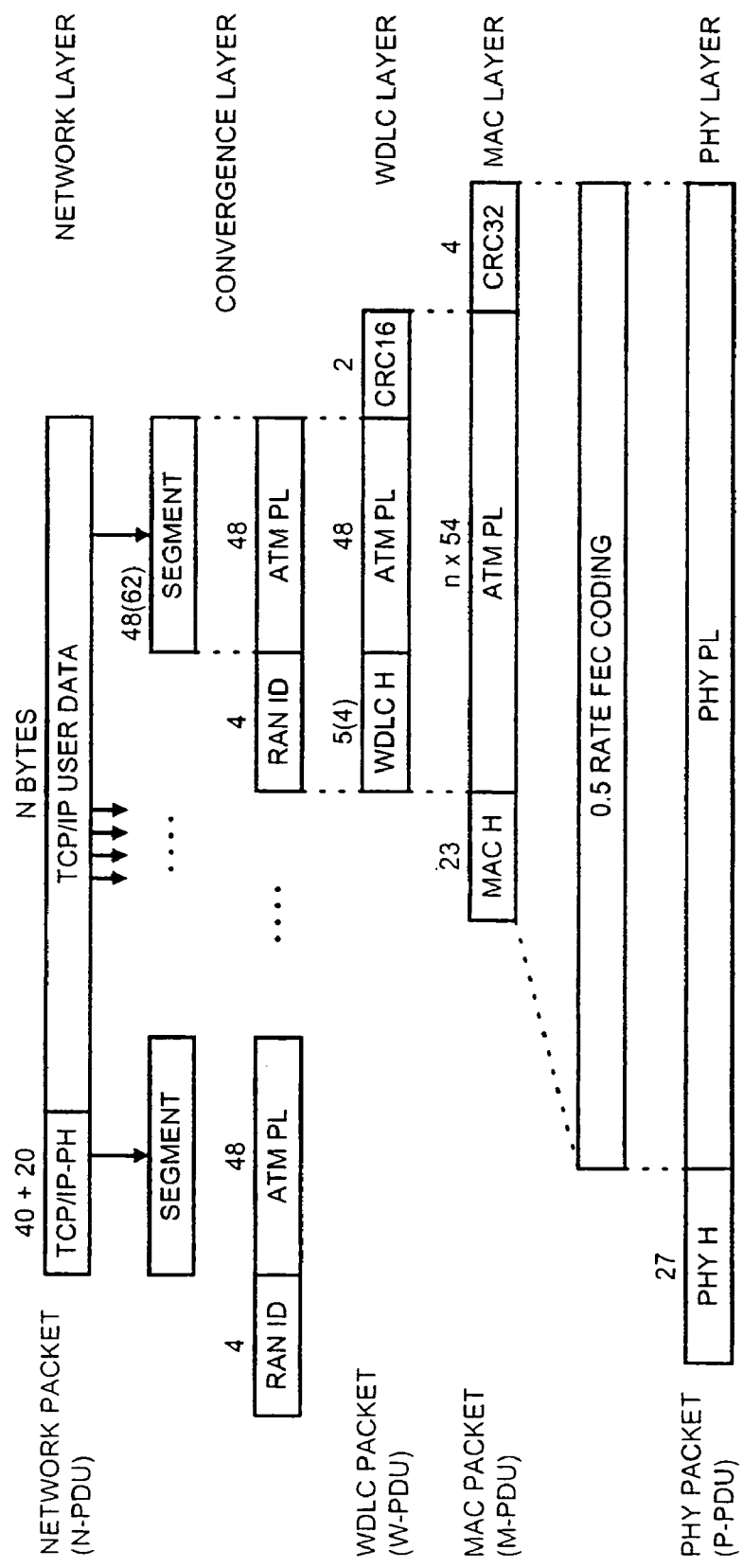
Figure 11:
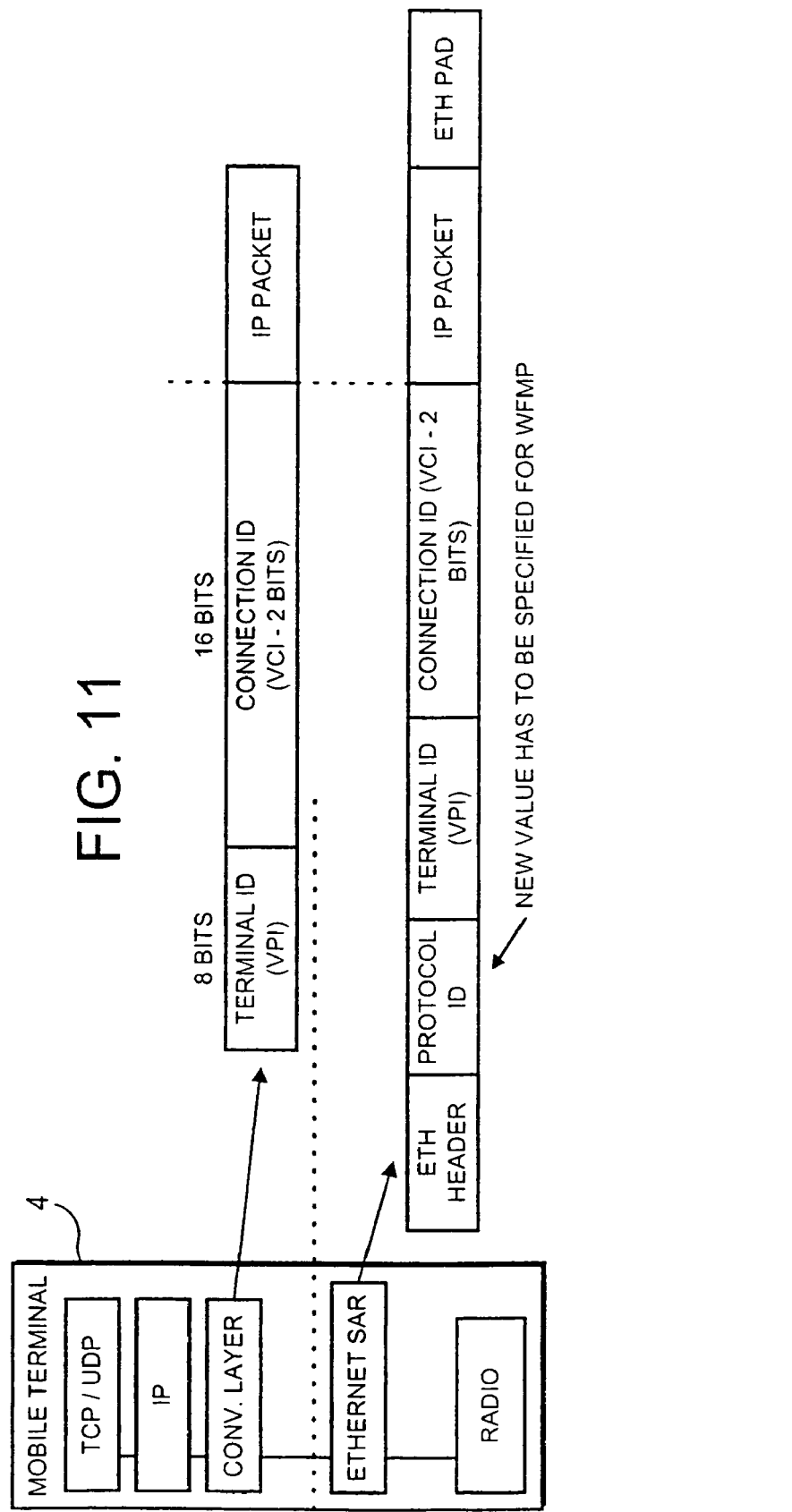
Figure 12:
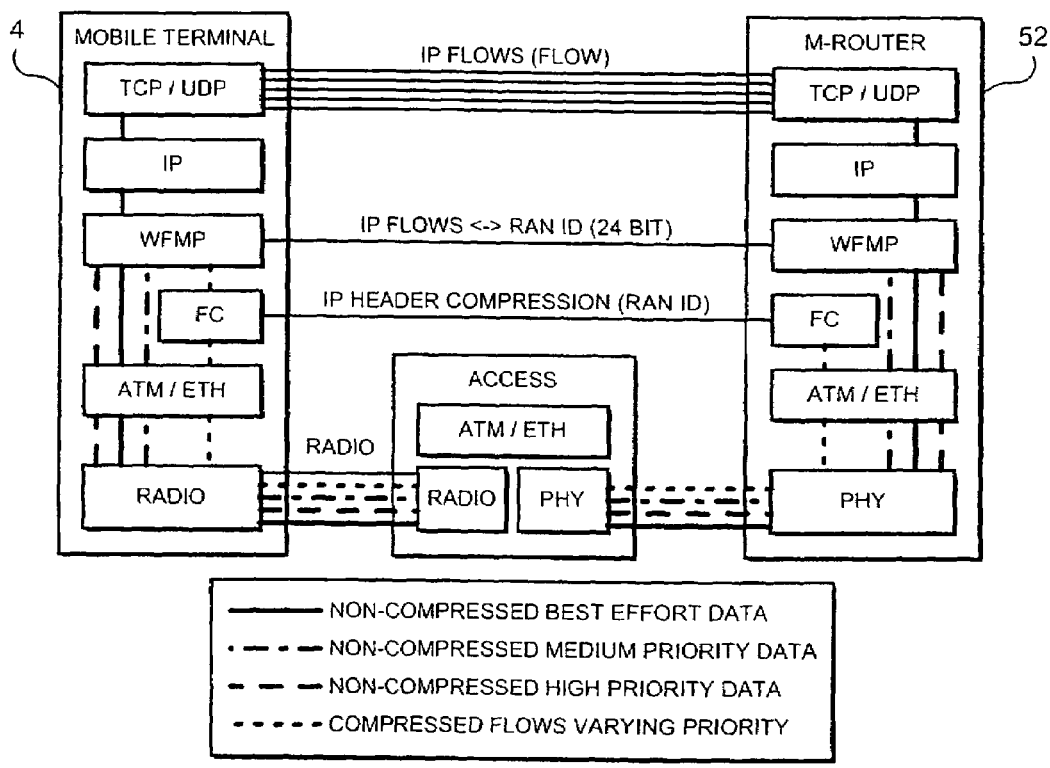
Figure 13:
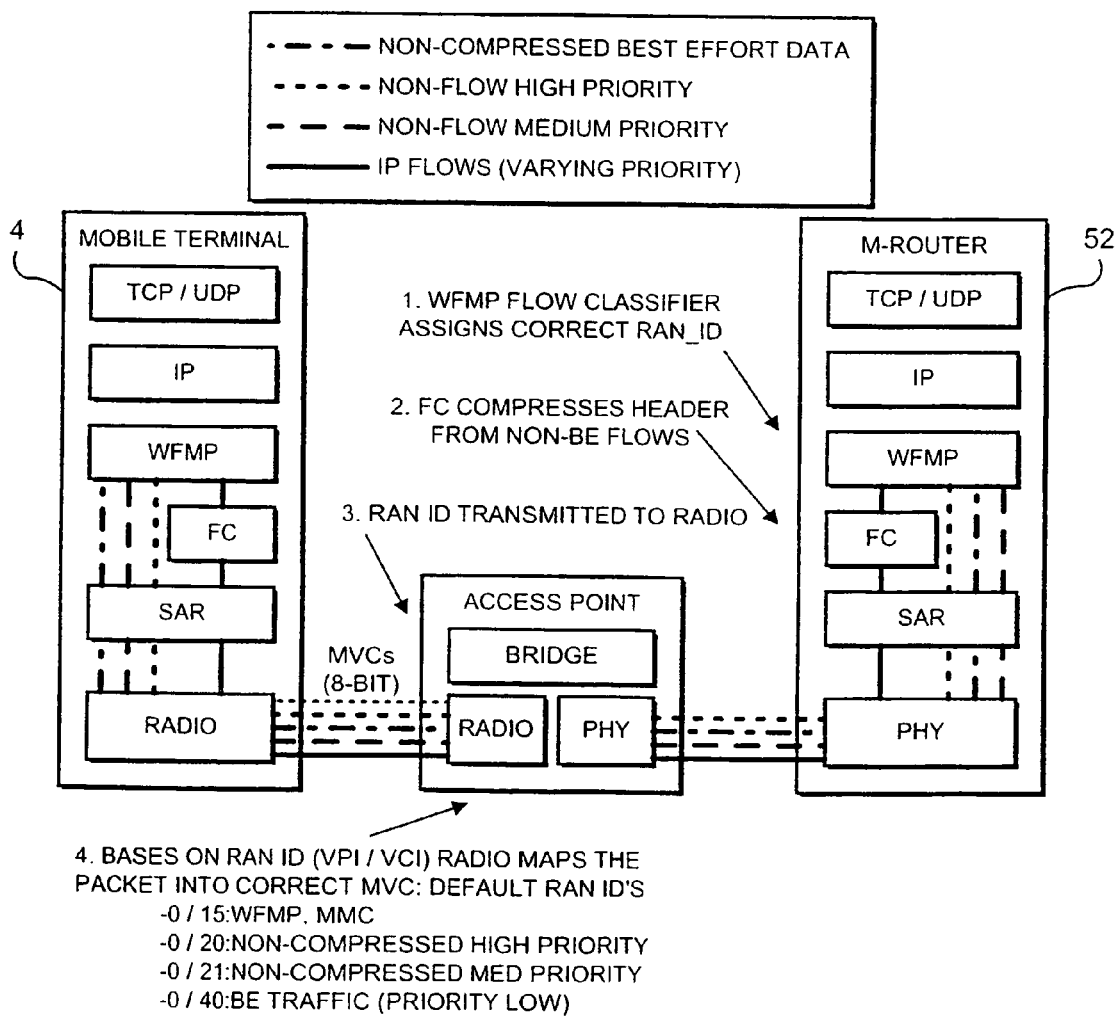
Figure 14:
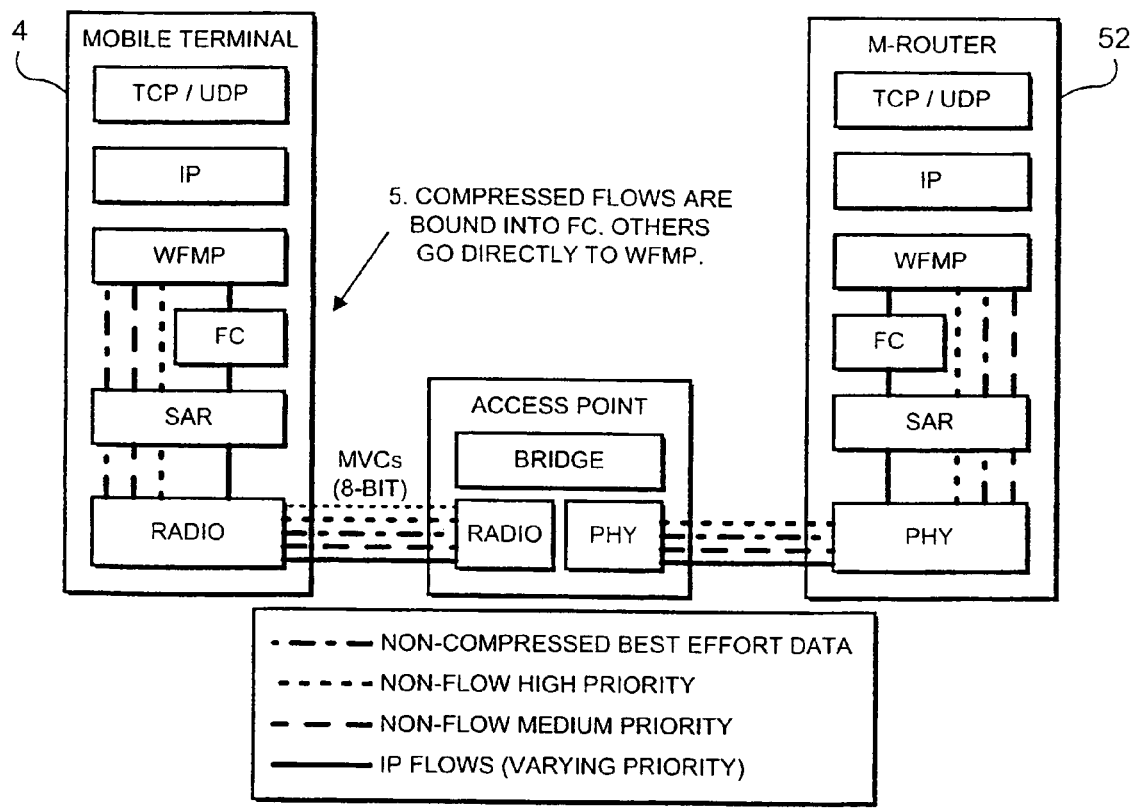
Figure 15:
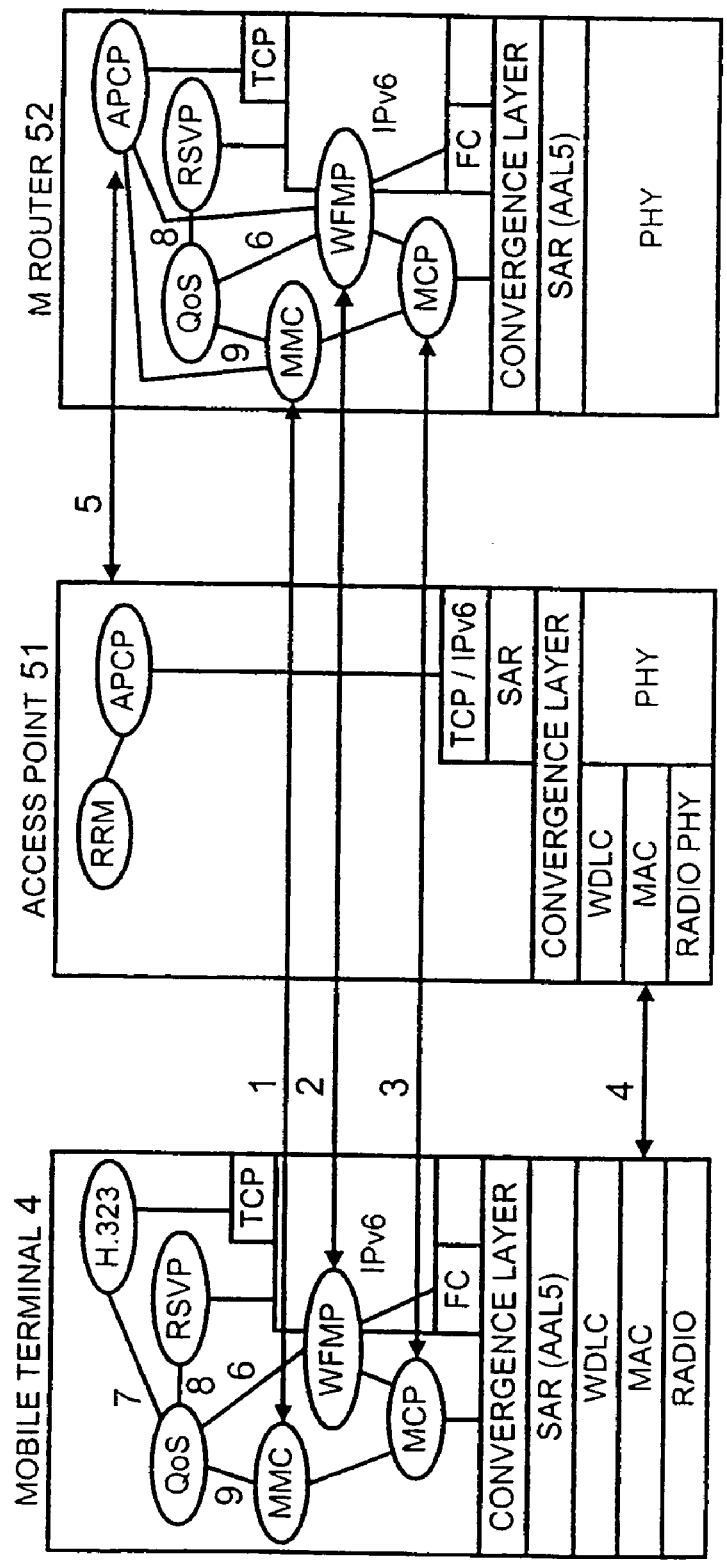
Figure 18:
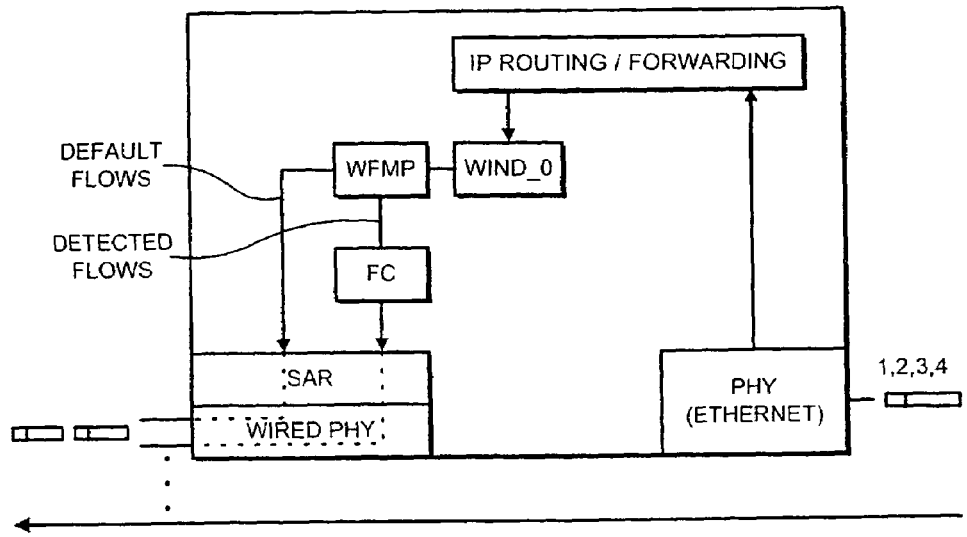
Figure 19:
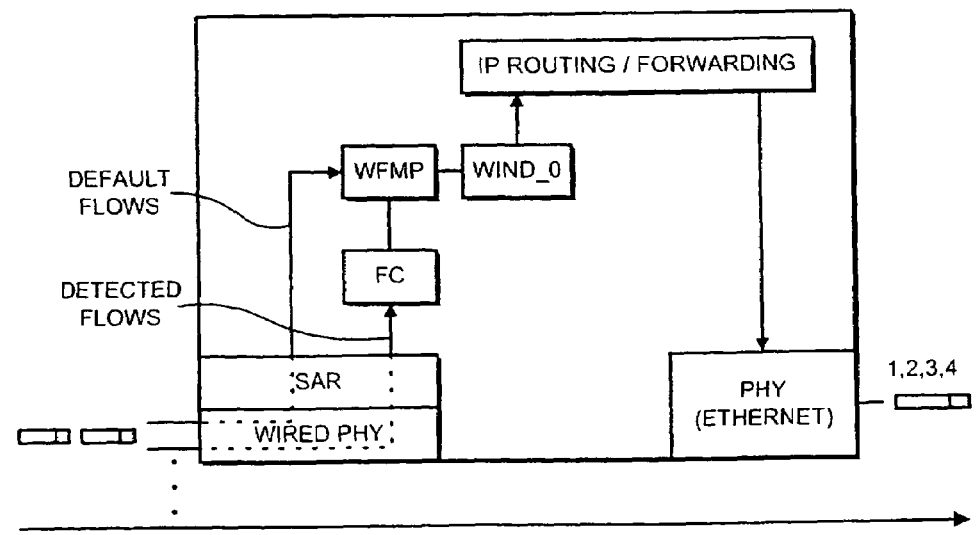
Figure 20:
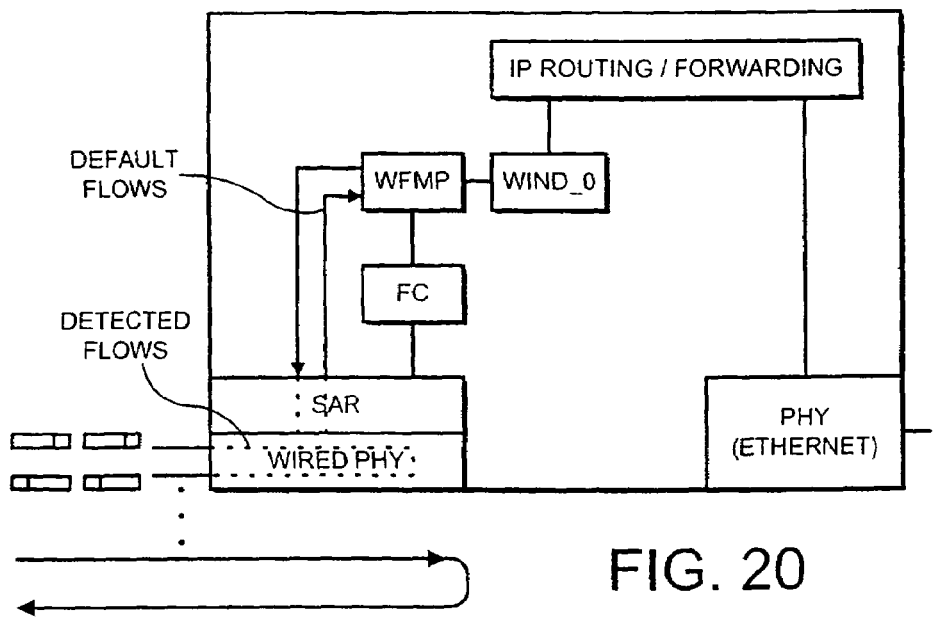
Figure 21:
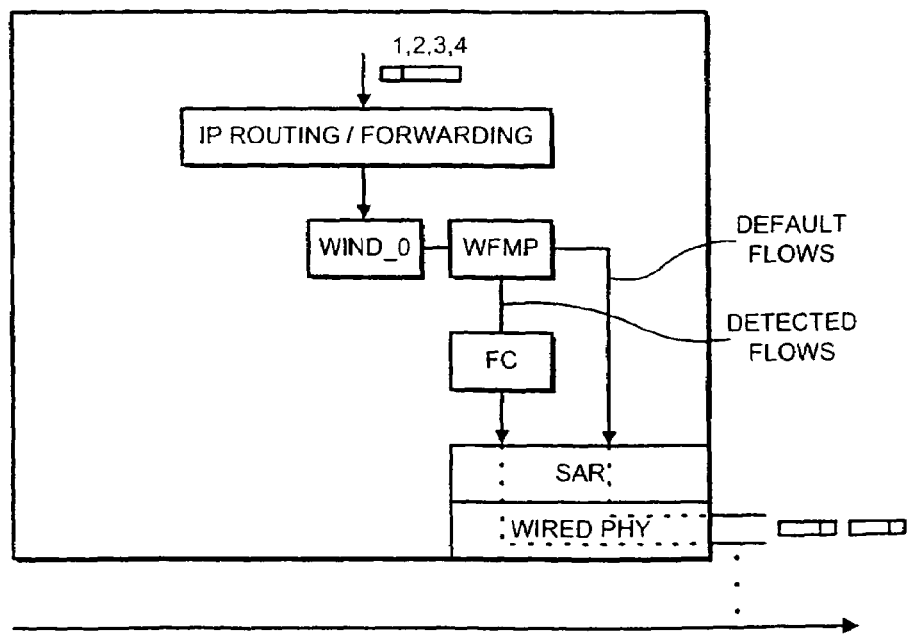
Figure 22:
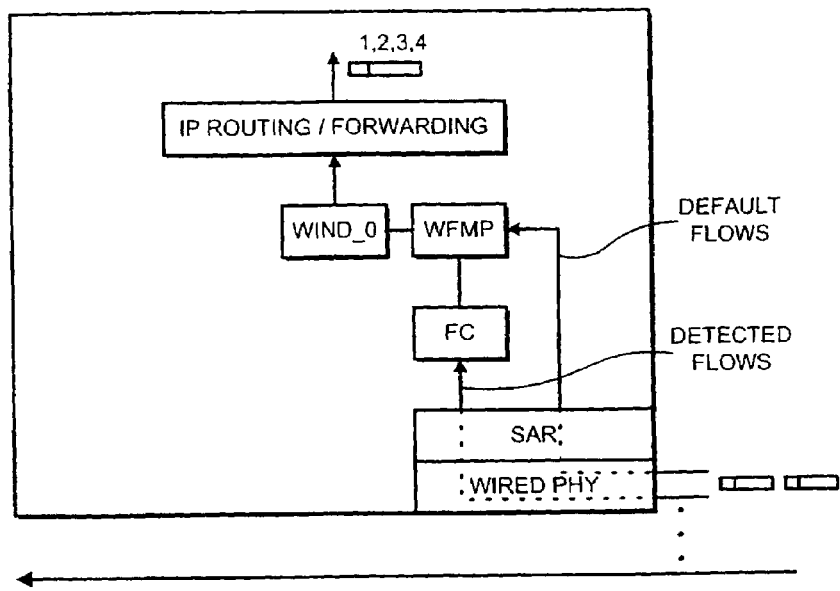
Figure 23:
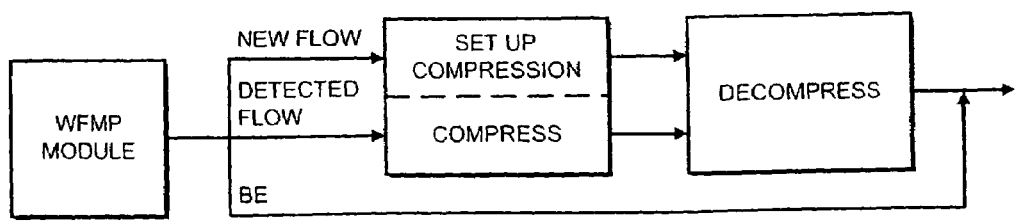
Figure 24:
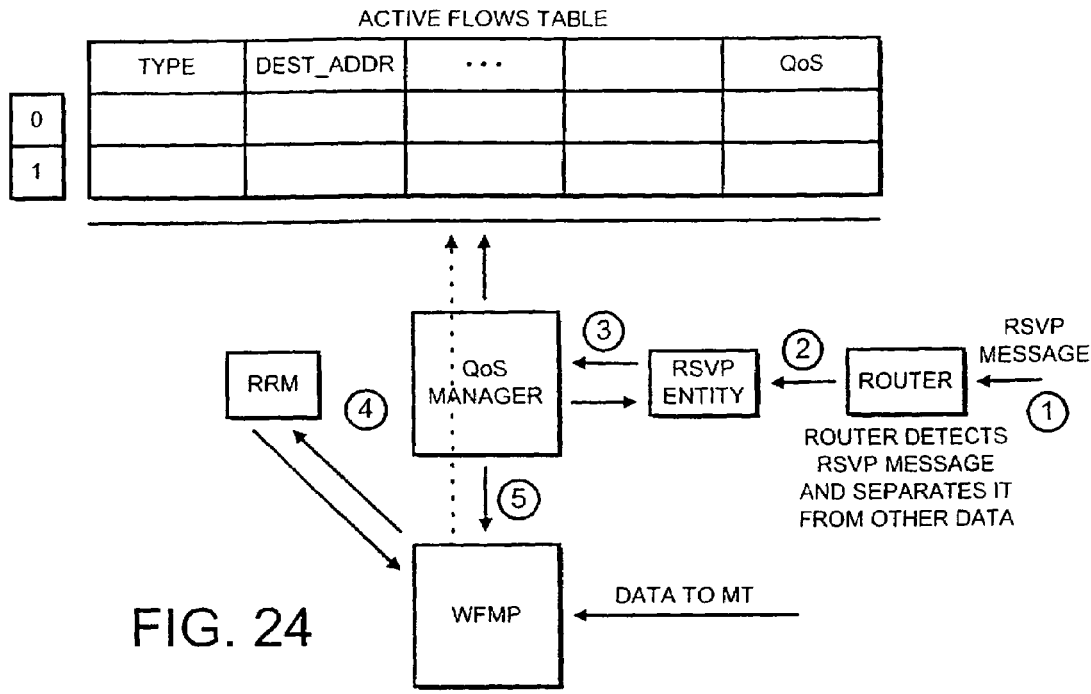
Figure 25:
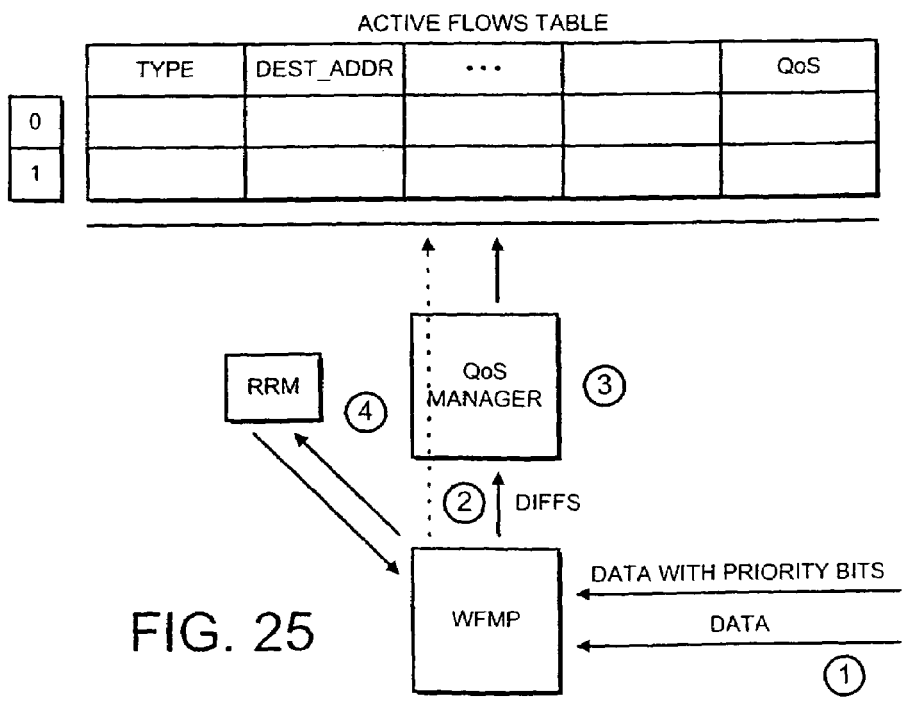
Figure 26:
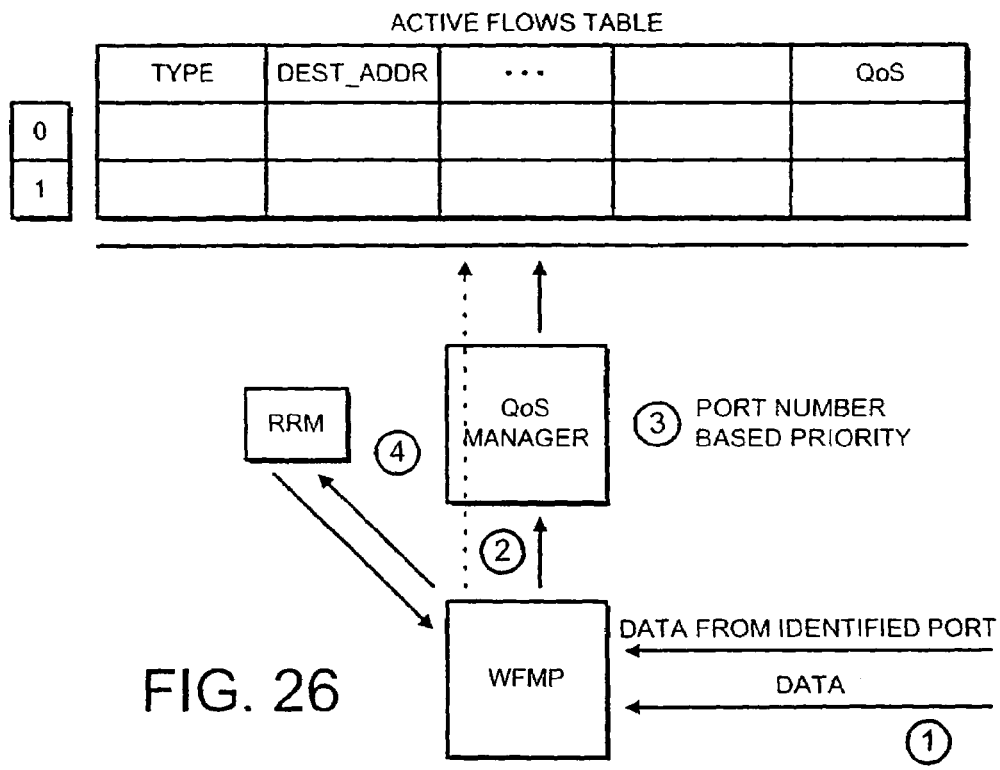
Figure 27:
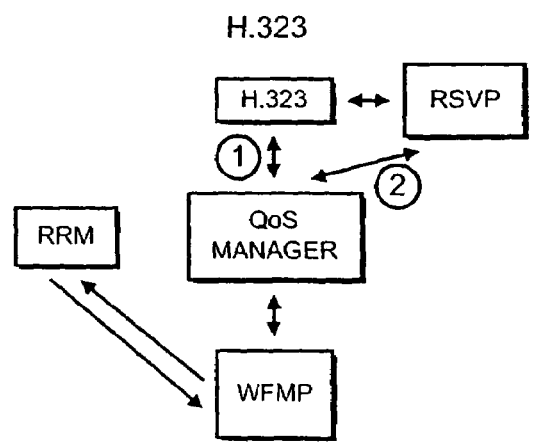

FIG. 4 gives an overview of the data path architecture;

FIG. 5 illustrates transmission link alternatives;

FIG. 6 shows an Ethernet based system architecture;

FIG. 7 shows the data plane for ATM;

FIG. 8 shows the data plane for Ethernet;

FIG. 9 illustrates an exemplary structure of a radio access network identifier (RAN_ID);

FIG. 10 illustrates packet encapsulation if an ATM transmission link is used;

FIG. 11 illustrates flow mapping in the case of an Ethernet transmission link;

FIG. 12 outlines of the defined flow management scheme;

FIGS. 13 and 14 illustrate an IP and radio flow multiplexing scheme;

FIG. 15 illutrates the system architecture and main interfaces;

FIG. 16 fives an example of different flow types;

FIG. 17 illustrates typical WFMP tables;

FIG. 18 shows mobile router (M-router) WFMP routing for downlink packets;

FIG. 19 shows M-router WFMP routing for uplink packets;

FIG. 20 illustrates transmission between two mobile terminals;

FIG. 21 illustrates the mobile terminal side WFMP operation for the uplink;

FIG. 22 illustrates the mobile terminal side routing for the downlink;

FIG. 23 illustrates a flow compression (FC) structure;

FIG. 24 illustrates Integrated Services;

FIG. 25 illustrates Differentiated services;

FIG. 26 illustrates Port information;

FIG. 27 illustrates H.323; and

Figure 28:
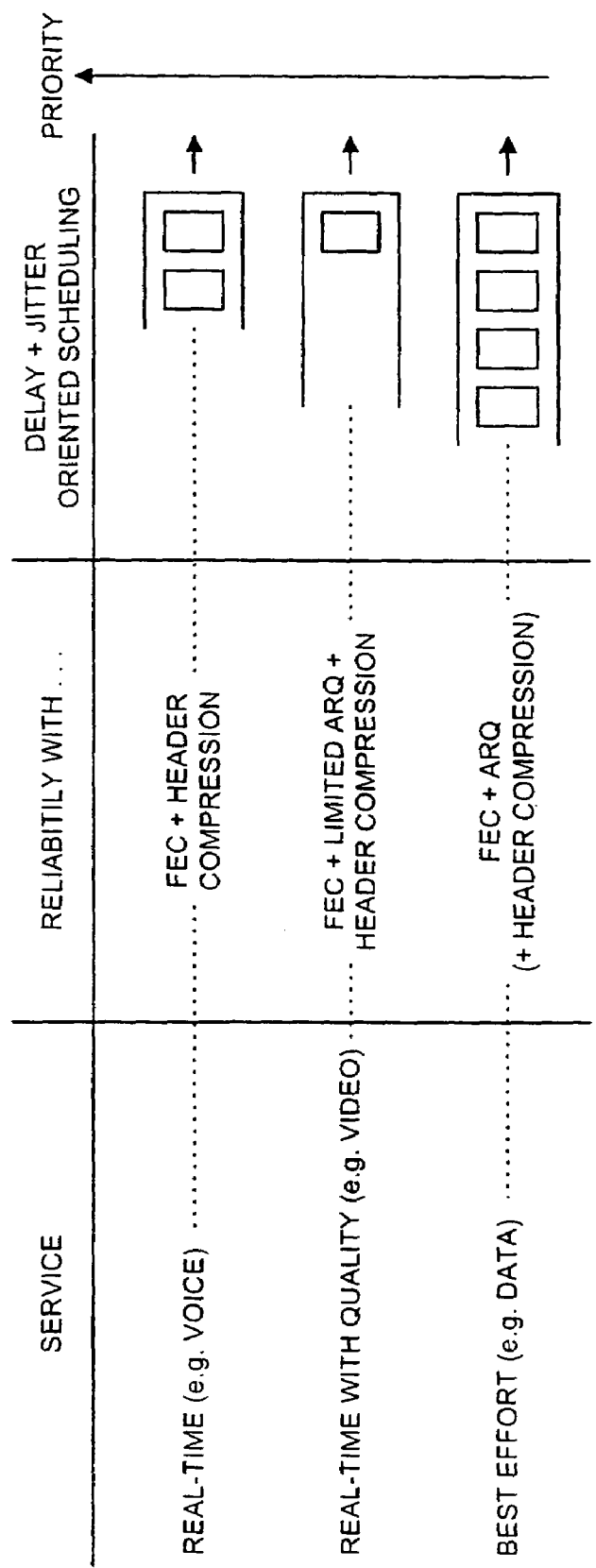

FIG. 28 shows a Wireless QoS driven queuing and error control strategy.

A wireless IP network architecture of a preferred embodiment of the invention will now be described, which enables efficient mobile access to both narrow-band packet data services and to delay-sensitive broadband multimedia services. Firstly, the system architecture will be described, including the network structure, data plane architecture, and IP flow management and architecture.

Firstly, the general system architecture defining the main physical blocks, protocol framework and the main internal interfaces will be discussed. Then, the functionality and interworking of defined functional entities and protocols will be illustrated.

Network Structure

Theoretical Reference Model

Figure 1:
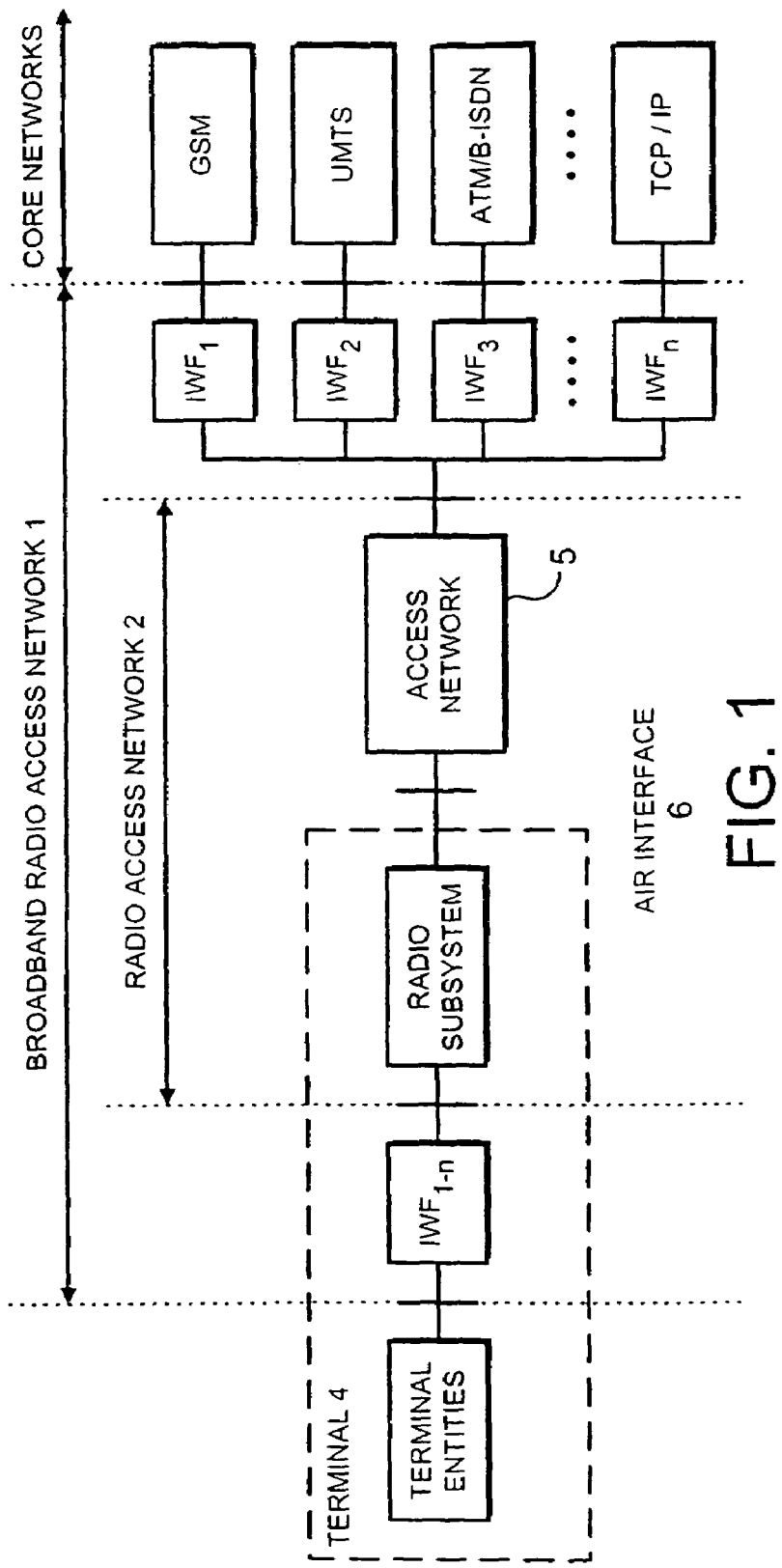
FIG. 1 illustrates a GRAN Reference Model.

The system architecture follows the outlines of the theoretical General Radio Access Network (GRAN) reference model, illustrated in FIG. 1 of the accompanying drawings [ES21]. A broadband radio access network 1 (BRAN) includes a radio access network 2 (RAN) and core network dependent interworking functionality (IWF) blocks. The RAN holds all the radio dependent parts and the IWFs link RAN to various core networks 3 and terminal entities 4. Hereafter in the description, the term preferred system generally refers to the entire BRAN network covering RAN and necessary IWFs. The preferred system is connected to the IP core network.

Network Entities

Figure 2:
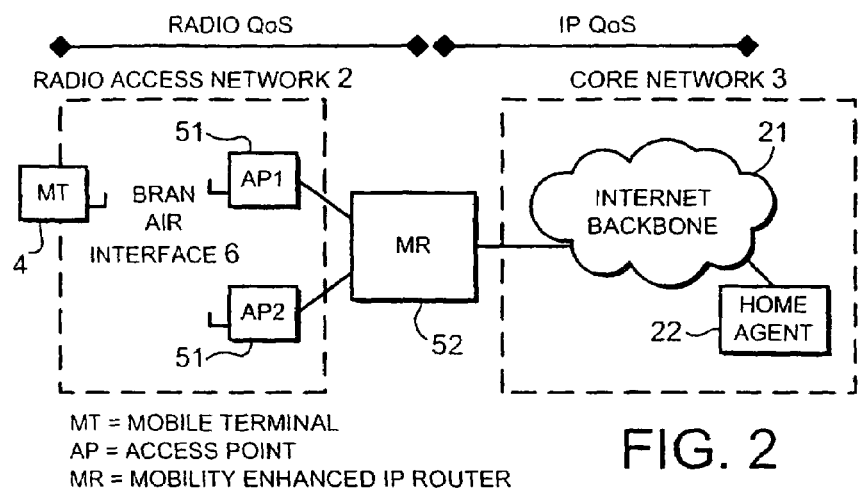
FIG. 2 illustrates a General System Architecture.

The broadband radio access network depicted in FIG. 2 is composed of a radio access network 2 having mobile terminals 4, access points 51, 51' and an air interface between, plus a mobility enhanced IP router 52(M-Router). The BRAN is connected to the core IP network which comprises the internet backbone 21 and home agents 22.

The radio access network 2 (RAN) implements all the radio dependent functionality such as radio resource management, setup and release of wireless flows, handovers and packet compression. It contains mobile terminals and access points. The mobile terminal 4 is the user's communication device for accessing wireless Internet services, and is the end point of the Internet and radio access network control protocols. The access point 51,51' implements all the radio dependent control functionality, such as radio resource management. It includes radio resource management and radio link control functions. The corresponding network elements in GSM are the base transceiver stations (BTS/TRX) and base station controller (BSC).

The M-Router 52 creates the wireless IP sub-network forwarding data to one or more access points. Alternatively, the M-Router may handle the mobility and location management of the terminals that are registered to the access points 51,51'. The M-Router provides IP mobility services, such as DHCP (dynamic host configuration protocol). DHCP is used for allocating IP addresses for the terminals. Corresponding element in the GSM network is the gateway GPRS support node (GGSN). The access points 51, 51' and the terminals 4 with an IP stack that belong to the same IP sub-network (use the same M-ROUTER) create a logical link.

The core network 3 comprises a home agent 22 which resides in the home network of an associated terminal 4 and is accessed through standard IP gateways. Typically home agent 22 is implemented as part of the M-Router 52 of the home network. However, it can also be a separate entity (e.g. PC host). The home agent 22 can contain user authentication information and a billing data base. It resembles the home location register (HLR) in GSM.

Target Environment

This preferred system of the invention may be used for private and public networks. Public networks are typically operated by Internet service providers or telecom operators. Common places for public wireless access network are hot spots, such as airports, hotels, railway stations etc. In this case the public network operator has to be able to reliably authenticate the users for billing purposes. In addition the network should offer security on IP level.

Figure 3:
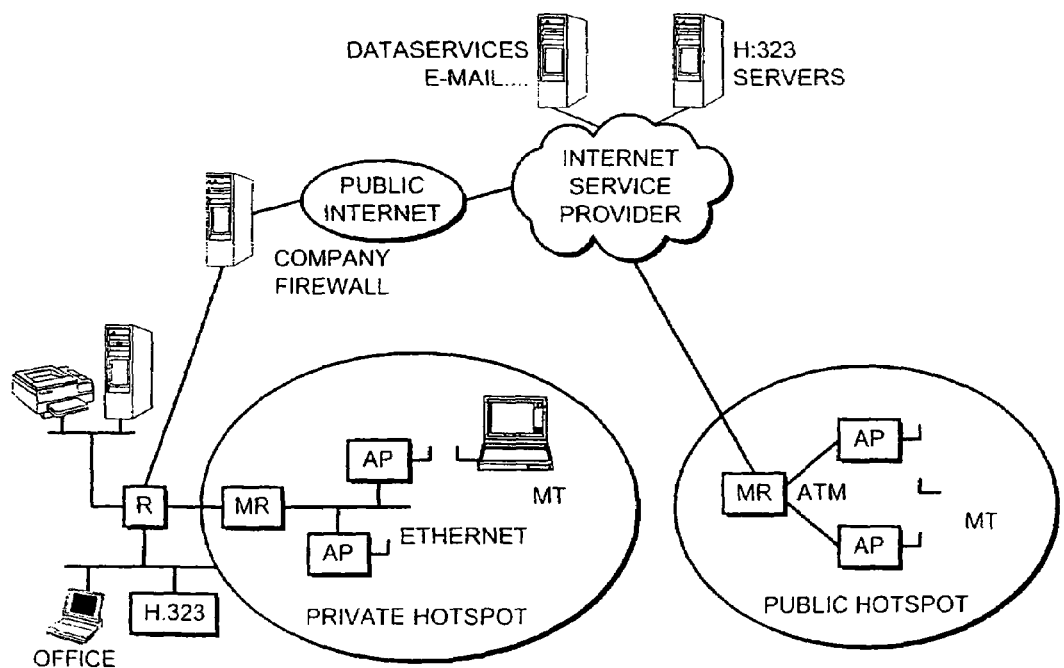
FIG. 3 shows target operating environment and transmission link alternatives.

Business local area networks (LANs) provide another interesting application area for the system of the present invention. Here the system provides a wireless extension for the existing fixed LAN infrastructure. Typical company LANs are based on Ethernet cabling. Therefore, in such an implementation the access points may be connected to the M-Router 52 via Ethernet. The M-Router can serve both fixed terminals and the mobile terminals 4. FIG. 3 of the accompanying drawings illustrates various transmission link alternatives.

Data Plane

The general architecture of the system at the OSI data layer level will now be described.

In the preferred embodiment of the invention, the M-Router 52 has a full TCP/IP stack functionality. It performs standard IP routing forwarding packets to the RAN interface and may embed wireless specific control functions such as radio flow control and terminal management functions. The incoming IP packets may be classified in the M-Router 52 as well be explained further below, In accordance with the invention. The M-Router 52 relays the incoming IP packet flows via the corresponding access point to the mobile terminal using the suitable QoS characteristics. The wireless extension controls radio flows, terminal mobility and location management. The M-Router 52 may control the access points using a specific control protocol. The access point 51 multiplexes the IP flows into radio flows. The access point can be a simple LAN bridge or alternatively implement a complete IP stack functionality. In the latter case the access point is capable of classifying the IP packet QoS class by reading the IP packet header and can therefore perform the mapping IP QoS class into the corresponding radio service queue with the corresponding Qos characteristics, described later in this invention. The access point 51 segments and re-assembles IP packets into segments that fit into radio link packets. The segmentation and re-assembly (SAR) blocks handle the segmentation between the mobile terminal 4 and the M Router.

The mobile terminal 4 includes all standard TCP/IP entities and wireless specific control services. The control messages are transparently sent between the M-Router 52 and terminals 4 utilising control functions. FIG. 4 illustrates the data path architecture.

Transmission Link Alternatives

The system offers alternative physical transmission links for connecting access points to the mobile router: e.g. ATM and Ethernet can be deployed. Here ATM refers to the physical link without control signalling. In this case ATM provides only segmentation and re-assembly and transmission services for IP traffic. The ATM option is intended for public telecommunication networks owned by a public operator whilst, as mentioned above, the Ethernet offers an ideal solution for private wireless business LANs. FIG. 5 illustrates these two transmission link options.

In the Ethernet case the neighbouring access points typically belong to the same Ethernet segment which is connected to the router. The access points in the same Ethernet segment have the same IP sub-network address. Therefore, they comprise one IP sub-network (called a mobility domain). The same router can control fixed network elements that are located in a separate IP domain. It is even possible to install access points to different router ports and to create several mobility domains with different IP network address. FIG. 6 illustrates the resulting architecture.

FIG. 7 of the accompanying drawings illustrates packet encapsulation in the ATM case. In the ATM link the M-Router port identifies the access point uniquely. The IP packets are encapsulated into AAL5 frames between the M-Router and the mobile terminals. ML5 layer segments the packets into 48-bit long ATM cell payload. In this case the access point passes the ATM cells transparently to the M-Router.

FIG. 8 of the accompanying drawings illustrates an example of packet encapsulation in the Ethernet case. In the Ethernet link IEEE MAC addresses may be used for identifying access points and the M-Router ports. The M-Router and the mobile terminal encapsulate IP packets inside Ethernet frames. Before packets are passed into Ethernet layer they are passed through an IP/Ethernet convergence layer. This convergence layer verifies the IP packet header and the requested IP QoS and maps the packets into the corresponding RAN queues. The dedicated flow label may be added between the IP packet and the Ethernet header and its concept is the subject of a published Finnish patent application FI980191. Its content is incorporated into the present application by reference. The convergence layer marks the IP packets with radio access network specific RAN identifier (RAN_ID). In the case of ATM the RAN_ID may correspond to the VPI/VCI value while the Ethernet may use a random identifier allocated by the M-Router. This flow label corresponds to ATM virtual path identifier and thus resembles the IETF Multiple Protocol Label Switching (MPLS) concept. The flow label is decoded at the access point which multiplexes Ethernet packets into correct radio flows. The mapping between radio flows and Ethernet frames is done in the convergence layer.

FIG. 9 illustrates an exemplary structure of the RAN_ID and the mapping into the radio flows according to an embodiment of the present invention.

If ATM transmission link is used the flow mapping and the use of the RAN_ID (VPI/VCI) is trivial, and FIG. 10 illustrates the packet encapsulation for this case.

An alternative Ethernet based approach is to perform the mapping between IP QoS and radio QoS directly in the access point. In this case the radio flow identifiers are not necessary. The access point and the mobile terminal implement IP protocol stack and are thus capable of reading the type of the service field of the incoming IP packet header. Based on the requested IP QoS class the access point/mobile terminal multiplexes the data packet into the corresponding radio service queue. In this model the various connections are not distinguished in the air interface.

Outline of IP Flow Management

The internet protocol implements a connectionless packet data system. The data is carried inside packets, the header of which indicates the correct destination address. This transmission scheme does not enable the system to separate various connections. The only possibility to detect connections is to monitor the IP traffic inside the M-Router 52/mobile terminal 4 and to try to detect and classify IP packet streams, called IP flows. An IP flow is established if two hosts (applications) frequently (or regularly) send IP packets between each other. Flow classification is explained in more detail below. The network can assign certain QoS characteristics for a flow, which is required for multimedia service implementation in IP networks. For instance a particular flow can be prioritised in the router.

The mechanism of the invention maintains the QoS characteristics of the IP packets in the air interface and permits the prioritisation of different IP packets (flows) in the radio link. The concept may deploy radio flows which are created between the mobile terminal and the access points. In this case the specific radio flow identifiers may be utilised. An alternative mechanism is to perform direct mapping from the IP type of the service parameters into different radio level scheduling queues. The latter approach will not need to utilise IP or radio flows. The outlines of the specified alternative flow management in the preferred embodiment are as follows:

The M-Router 52 monitors the headers of the incoming IP packets and tries to classify the existing IP flows (i.e. regular packet streams) utilising the IPv6 flow label and/or destination and source IP/IPv6 addresses and ports. If the M-Router detects an IP flow, it will start marking the packets which belong to this flow with a specific RAN_ID (Radio Access Network IDentifiier). The router allocates a unique RAN_ID for each detected flow. RAN_ID is utilised for separating packets belonging to IP flows in the radio access network. Consequently, the use of RAN_ID will create "virtual connections" through which IP flows are packed cross the RAN (MT-M-ROUTER). RAN_ID corresponds to the ATM VPI/VCI identifiers. A wireless flow management protocol (WFMP) is disclosed in the aforementioned copending application (Annex 1) for managing RAN identifiers. Both the terminal 4 and the M-Router 52 have WFMP entities which communicate peer-to-peer over the wireless link. WFMP actually provides the convergence layer functionality. The M-Router WFMP detects flows, allocates RAN_IDs and informs mobile terminal WFMP of the assigned ID value. To minimise the overhead the RAN_ID may be compressed into a shorter radio flow identifier.

As mentioned previously, the radio link is the bottleneck concerning QoS and the throughput. The present invention addresses this problem in this preferred embodiment by providing a system which includes a few radio scheduling queues with different service characteristics, which improves the wireless support for broadband services. The radio sub-system handles various radio queues i.e. radio QoS classes differently. It may have, for example, three separate buffering queues for the incoming traffic: high priority queue for real-time traffic, medium priority queue for non-realtime data and low priority queue for best-effort data. Two alternative mechanisms may be used for mapping the QoS requirements of the IP packets into the radio level QoS functions: direct QoS Mapping or radio flow based QoS mapping of the IP packets.

Direct QoS Mapping

In the direct QoS mapping scheme the access point and the mobile terminal classify the header of the IP packets to be transmitted over the air interface. All IP packets are treated independently in this approach. The access point or the mobile terminal, i.e. the end points of the radio link, encapsulate the IP packet to be transmitted inside the radio link protocol structure. The radio link service queue is selected on the basis of the value of the type of the service field (diffs. bits) of the original IP packet. Based on this value the IP packet is mapped into the corresponding scheduling queue, e.g. the real-time, medium priority or the best-effort data queue which will have different service characteristics and transmission priorities.

Radio Flow IP based QoS Mapping

As mentioned above, the system of the present invention may use either direct QoS mapping or IP flow detection idea for managing connections in the radio access network. The idea of IP flow mapping is to separate IP flows from the best-effort IP traffic to be able to treat the flows differently. The different treatment means that different priorities (QoS classes) can be given to the detected flows, and that the detected flows can be compressed to save the radio resources.

The present invention concerning flow based QoS mapping resides in the provision of fixed channels for different QoS classes. In this embodiment, each mobile terminal has three default radio channels: one for best-effort traffic, one for medium priority traffic and one for high priority traffic. All the default channels are terminated at the M-Router WFMP module (n-to-1 relationship). In addition to the default channels, mobile terminals can have detected flows. FIG. 16 shows how the different flows are routed inside the network. The figure presents a simplified network architecture where two mobile terminals are connected to the M-Router through two access points (only the AP interfaces are shown). Each MT has three different radio level QoS queues. M-Router and the mobile terminal side operations are explained.

In the IP flow based mapping scheme the M-Router establishes flows. The system may also enable the mobile terminal to request the M-Router to establish a radio flow (RAN_ID) with a given priority for a particular IP flow. As the M-Router classifies the IP flow it assigns the corresponding priority class for the established radio flow. The decision is made on the basis of the IP flow type and traffic characteristics. Various radio flow priorities enable wireless broadband services.

Only the detected IP level flows will be switched into separate radio flows.

The other IP packets are transmitted over the air as best-effort data. The reference system of this embodiment may define either fixed (hard-coded) radio flow identifiers which are used for transmitting non-flow packets or to dynamically assign flow identifiers for these flows. The reference system offers three multiplexed radio flows per terminal, one for each radio priority queue. As mentioned above, these "default" radio flows are provided according to the present invention for improving the support for inter-IP domain mobility and differentiated services. In the scheme of the preferred embodiment, the M-Router 52 or the terminal 4 can look at the priority bits of a single IP packet and send that with the corresponding radio QoS (priority). Then, as soon as an IP flow is detected, the packets can be switched into a separate radio flow with certain QoS and with IP header compression. FIG. 12 summarises the defined flow management concept for IP flows. The detected IP flows are marked with a dedicated RAN_ID label (in ATM VPI/VCI). The access point performs RAM flow-radio flow multiplexing, i.e. mapping between RAN_ID and MVC. The M-Router manages the location of MTs and updates the routing table if the mobile performs handover between access points. The extra benefit of the utilisation of separate radio flows is that it allows the application of the IP header compression scheme (FC block in FIG. 12).

IP Flow Multiplexing

FIGS. 13 and 14 illustrate the flow management procedure for downlink traffic. The process is as follows:

The M-ROUTER monitors the incoming traffic continuously. As the amount of packets per IP flow (between certain hosts (ports)) exceeds the threshold value (per time), the WFMP establishes a RAN flow and allocates new RAN_ID for it. Next the packets belonging to the flow are passed to the access point via Flow Compression (FC) using the allocated flow specific RAN_ID. In accordance with the invention, the IP packets that do not belong to any flow are marked with one of three default RAN_IDs for providing differentiation.

The FC entity compresses the IP header of the detected flows and copies RAN_ID to the resulting packet. In the receiving end the peer FC entity can detect the correct source by decoding RAN_ID and assigns the missing IP header before the packet is passed to the upper layers. Only detected IP flows are compressed.

In this embodiment, the access point 51, 51' has a conversion table which maps the MVCs (radio flows) into correct RAN_IDs. The M-Router 52 allocates RAN_ID address space per access point. The packets are then transmitted to the M-Router with RAN_ID "flows". Next, the packets are transmitted to the radio link. The default RAN_IDs are assigned with a fixed radio link priority. In this embodiment, three default "pipes" (RAN_IDs) exist for user data: real-time flow, non-real time flow and best-effort flow. Of course, an alternative number of default channels could be used depending on requirements. For example, two channels—high and low priority might be sufficient in some instances, where congestion is not likely to be such a problem, and in other circumstances, the separation into a further number of QoS characteristics might be required. Each channel or pipe has a pre-configured RAN_ID. The non-flow IP traffic is transmitted within these flows without any compression.

The radio of the access point (layers 1 and 2) allocates unique MVC values per RAN_ID. Three default MVC "pipes" exists for the non-compressed traffic also in the air interface. The default RAN_IDs are mapped into the corresponding hard-coded MVCs while compressed IP flows are switched into dedicated MVC connections. Different flows are separated in the in the air interface using MVC and terminal wireless MAC addresses.

In the mobile terminal 4 of this embodiment, its radio modem converts the received MVC into the corresponding RAN_ID value and passes the packet to the SAR layer which reassembles the data into IP packets still maintaining RAN_ID information. The compressed flows are then passed to FC which identifies the RAN_ID and adds the correct IP header information. The default RAN_ID traffic is passed directly to the WFMP.

Protocol Architecture

The detailed system architecture of the preferred embodiment of the present invention is illustrated in FIG. 15. The main external interfaces are listed in the following tables.

TABLE 1

External Control Interfaces

| IF# | Interface | Explanation |
|---|---|---|
| 1. | MMC—MMC | Mobility management messages between terminal and M-Router. Mobility management messaging is used as a new terminal registers into the network and in the case of handovers. |
| 2. | WFMP—WFMP | Flow management control signalling messages. This is used for establishing and releasing radio flows. |
| 3. | MCP—MCP | Mobile Control Protocol (MCP) provides a reliable peer-to-peer protocol for transmitting WFMP and MMC messages between the mobile terminal and the M-Router. MCP is used for all wireless specific signalling. |
| 4. | Radio control messages | Radio control messages are used for transmitting radio link control messages. For instance terminal association and radio flow (MVC level) control signalling is carried here. |
| 5. | APCP interface | Access Point Control Protocol (APCP) is used for sending radio link control and radio resource management messages between the access points and the mobile router |

The external control interfaces define the logical interface between the mobile terminal 4 and the radio access network (access points 51, 51', M-Router 52) and between the radio access network 2 and the core network 3(AP-M-Router). Router). The external interfaces have to be standardised, if the target is to define compatible standard system which can be composed of devices from different manufacturers.

In addition to the standard interfaces the system has also several important internal control interfaces, which are listed in the table below:

TABLE 2

Internal Control Interfaces

| IF# | Interface | Explanation |
|---|---|---|
| 6. | Wireless QoS controller - WFMP interface | This is an internal interface which is used for transmitting flow establishment requests and QoS information between the QoS manager and the WFMP. As M-ROUTER-WFMP detects a new flow it queries the radio link priority from the QoS manager. In a real implementation QoS manager and WFMP can be integrated into a single entity which removes interface 6. |
| 7. | Wireless QoS controller - H.323 interface | This interface is used for relaying explicit H.323 traffic characters, such as delay and throughput to the radio link QOS. H.323 control signalling is decoded in the mobile terminal and the required QoS is communicated to the proprietary wireless QoS manager. QoS manager will use manufacturer specific rules for converting H.323 QoS into radio flow priority. NOTE: H.323 specification defines a standard interface to the RSVP. This could be also used here instead of implementing dedicated connection between QoS and H.323. |
| 8. | Wireless QoS controller - RSVP interface | Wireless specific QoS controller interacts with RSVP module for obtaining resource reservations and converting those into radio |

TABLE 2-continued

Internal Control Interfaces

| IF# | Interface | Explanation |
|---|---|---|
|  |  | resource reservations and radio QoS. The RSVP module requests certain QoS from wireless QoS manager via this interface. |
| 9. | Wireless QoS controller - MMC interface | This interface is used in the case of handovers. The MMC module informs the QoS controller about the handover and requests QoS controller to re-establish wireless flows. This establishment request is then forwarded to WFMP entity. |

The system architecture includes the following functional blocks specific to the preferred embodiment of the invention:

QoS—Wireless QoS controller: This entity allocates the radio link QoS for the IP packets. QoS controller has an interface to H.323 and RSVP blocks which can give explicit QoS requirements, such as delay, bandwidth, for the IP flow. If no explicit QoS parameters are available QoS manager assigns the QoS on the basis of DS field (differentiated services) or on the basis of port information (standard applications). As WFMP detects a flow it informs M-Router-QoS entity of the evaluated packet throughput, this information can be also deployed for allocating radio link QoS. The QoS controller transmits the allocated radio link QoS values to the WFMP entity which then establishes radio flows with selected QoS. The QoS controller can also send QoS update messages through WFMP. Using QoS update message QoS controller can change the radio QoS value for existing flows. This functionality is useful for instance if H.323 or RSVP parameters change during the connection.

Mobility Management Controller (MMC): MMC entity is responsible for the terminal mobility management. The M-ROUTER-MMC has a database which contains information of the registered terminals and their current location (access point). During the terminal registration MMC can be used for authenticating the user. The mobile terminal MMC initialises the handover by sending a handover_request message to the M-Router-MMC which checks the radio resources in the new access point and requests WFMP to establish new radio flows in the new access point and to release the old radio flows.

Wireless Flow Management Protocol (WFMP): WFMP entity manages the radio flows. It detects IP traffic and classifies IP flows. As WFMP detects a new flow it passed flow information to QoS controller that assigns the correct radio link priority for the flow. Next WFMP establishes the radio flow with the allocated priority. WFMP allocates RAN_IDs and updates access point RAN_—radio flow tables. The M-Router includes a master WFMP which classifies the flows and maintains the data base of all the existing flows while the mobile terminal includes only a simple WFMP entity that multiplexes the RAD_IDs into correct radio flows. MT-WFMP can request the M-ROUTER-WFMP to establish a new radio flow with a given priority. This is the case for instance if MT-H.323 requests a flow with explicit QoS. Also the inter-router handover procedure can utilise this mechanism for quickly setting up flows between the mobile terminal and the new M-Router after the handover.

Mobile Control Protocol (MCP): MCP protocol transmits WFMP and MMC messages between the mobile terminals and the M-Router. MMC provides a reliable mechanism for transmitting control information. MMC implements a simple go-back-N type of retransmission protocol. A separate low layer protocol was added instead of using TCP/IP in order to guarantee a reliable transmission of control messages. TCP/IP will not allow separating control messages from the other TCP traffic. Therefore, e.g. in the case of handover the control messages would be mixed with the user data traffic, which causes a significant delay for the handover procedure and re-establishing connections. The use of MCP allows to prioritise all the control traffic before the user data packets.

Flow Compression (FC) block: The M-Router and mobile terminals include FC entities which compress the detected IP flows. Flow compression is used only for the classified IP flows. The other IP traffic is sent without compression.

Radio Resource Manager (RRM): Each access point has a RRM entity that manages the radio resources of the particular access point. In the present system WFMP sends resource queries to RRM each time a new flow is established. WFMP transmits the requested radio flow priority (allocated by QoS) and estimated flow rate (WFMP evaluator). Based on this information RRM decides whether the connection is accepted or not. RRM provides a mechanism for each access point to dynamically manage the radio resources. RRM compares the estimated flow rate to the free capacity of the requested radio flow. If insufficient capacity is available RRM can propose. WFMP to use lower QoS. If WFMP gets a return QoS value which is lower than the requested QoS it can either stop establishing the connection or to continue with lower QoS. In the case of IP RRM capacity calculations are mainly based on the estimated flow rate (M-ROUTER). Only RSVP and H.323 signalling provide explicit throughput and delay requirements which can be directly mapped into RRM.

Access Point Control Protocol (APCP): APCP protocol provides a mechanism for transmitting control messages between the access points and the M-Router. APCP can be located on top of TCP/IP stack which guarantees a reliable transmission of control messages. WFMP deploys ACPC for RRM queries and for sending flow control information to the radio sub-system.

The detailed functionality of the system is explained below.

IP Flow Management

As mentioned above, the system of the present invention uses IP flow detection idea for managing connections in the radio access network. The idea is to separate IP flows from the best-effort IP traffic to be able to 'treat' the flows differently. The different treatment means that different priorities (QoS classes) can be given to the detected flows, and that the detected flows can be compressed to save the radio resources.

The present invention resides in the provision of default channels for at least two different QoS classes. In this embodiment, each mobile terminal has three default radio channels: one for best-effort traffic, one for medium priority traffic and one for high priority traffic. All the default channels are terminated at the M-Router WFMP module (n-to-1 relationship). In addition to the default channels, mobile terminals can have detected flows. If the other end of a detected flow is located at the IP core network, the flow is terminated at the M-Router compression module (all flows are compressed). In case the correspondent node is another mobile terminal, the flow is switched directly between the AP interfaces. FIG. 16 shows how the different flows are routed inside the network. The figure presents a simplified network architecture where two mobile terminals are connected to the M-Router through two access points (only the AP interfaces are shown). Each MT has the default channels (three of them), one flow to the IP network, and one flow switched between the mobile terminals.

Next, the WFMP flow management functions are described in detail. Both the M-Router and the mobile terminal side operations are explained.

Flow Classification

WFMP is responsible for flow detection and routing of IP packets between the network and mobile terminals/radio connections. The function handling flow detection is called the flow classifier. Flow classifier decides when IP packets belong to a flow and after the decision binds the flow to a radio connection. It also needs to detect when a flow terminates and release the corresponding radio connection.

Flow classification works so that WFMP monitors the IP traffic and specific header fields in order to detect new flows. Depending on the IP and transport protocol header fields, the following four different flow types can be specified:
1. Flows identified by flow labels (type 1)
2. Flows identified by TCP/UDP port numbers (type 2)
3. Flows identified by the source and destination IP addresses+the security parameter index (type 3)
4. Flows identified by the source and destination IP addresses (type 4)

The first option can be applied if the applications are able to use the IPv6 flow label to mark the different IP sessions. If such advanced applications are not available, and if TCP/UDP port information is available, flow type 2 is selected. In case IP encryption is used, the second option cannot be applied since the port information is encrypted. In such a case, security parameter index (SPI) is used with source and destination addresses to identify possible flows. If no TCP/UDP port information, flow labels or SPI parameters are available, the only option is to look just for the source and destination IP addresses and separate flows between hosts (the first two options separate flows between IP sessions/processes).

Each flow type specifies the set of fields from the IP packet header that are used to identify a flow. The set of the header fields identifying a particular flow is called the flow identifier. Depending on the flow type, the flow identifiers contain the following fields:

Type 1: source address+destination address+flow label
Type 2: source address+destination address+protocol (next header)+source port+destination port
Type 3: source address+destination address+security parameter index (SPI)
Type 4: source address+destination address WFMP can differentiate between these four flow types, and based on the flow classification mechanism bind each flow type to a flow. Three different flow classifier mechanisms which may be applied in the present system are:
X/Y classifier, meaning X packets (with the same flow identifier) in Y seconds resulting in a new flow
Protocol classifier which simply assigns all TCP packets to flows
Port classifier, using transport layer port numbers to decide which flows to bind.

The X/Y classifier is the preferred choice as it is the only one which supports flow types 1 and 2

Flow Detection Criteria

Typical flow detection criteria for the X/Y classifier are listed in Table 3 X/Y classifier recommendations. The table gives values for X and Y in a function of different amount of flow space available (in this case the flow space refers to the amount of radio connections required). Expected performance means the portion of packets switched to flows.

As can be seen, the values are somewhat different in different environments. Therefore, it should be possible to change easily the values of X and Y in the WFMP implementation.

TABLE 3

X/Y classifier recommendations

| Flow space req. | Gateway | Campus/Enterprise Backbone |
|---|---|---|
| 1K | Classifier: X = 5/Y = 15 sec. Flow deletion delay: 30–120 sec. Expected performance 85% | Classifier X = 40/Y = 40 sec. Flow deletion delay: 30–60 sec. Expected performance: 79% |
| 2K | Classifier: X = 5/Y = 60 sec. Flow deletion delay: 30–120 sec. Expected performance: 90% | Classifier: X = 10/Y = 45 sec. Flow deletion delay: 30–60 sec. Expected performance: 89% |
| 8K | Classifier: X = 2/Y = 60 sec. Flow deletion delay: 30–120 sec. Expected performance: 93% | Classifier: X = 5/Y = 60 sec. Flow deletion delay: 30–60 sec. Expected performance: 92% |
| 16K | Classifier: X = 2/Y = 60 sec. Flow deletion delay: 30–120 sec. Expected performance: 93% | Classifier: X = 2/Y = 60 sec. Flow deletion delay: 30–60 sec. Expected performance: 95% |
| 32K | Classifier: X = 2/Y = 60 sec. Flow deletion delay: 30–120 sec. Expected performance: 93% | Classifier: X = 2/Y = 60 sec. Flow deletion delay: 30–60 sec. Expected performance: 95% |
| ~ | Classifier: all packets Flow deletion delay: $\infty$ Expected performance: 99% | Classifier: all packets Flow deletion delay: $\infty$ Expected performance: 98% |

Since the establishment of a TCP connection always contains at least three packets used, and since the flow detection should be based on actual data packets, a minimum value of six for X is considered appropriate (third data packet triggering the flow detection). The value for Y could be 30 seconds.

Flow Deletion

A flow is deleted after some constant number of seconds of inactivity. When flow classifier detects a new flow, it starts the flow inactivity timer. This timer is re-started each time a packet belonging to that flow is received. Once the timer expires, the flow identifier is removed from the list of monitored packets. Finally, WFMP releases the flow both from the RAN and the mobile terminal.

RSVP Reserved Flows

When RSVP is used to reserve resources from the network, the M-Router RSVP module needs to communicate with the mobility specific modules to reserve resources from the radio access network. RSVP module has an interface to the QoS manager and through this interface it asks the QoS manager to check the wireless resources. After converting the RSVP request to a QoS class, QoS manager requests WFMP to reserve the connection from the AP. This request (identified by flow type 5 inside WFMP) automatically triggers flow detection in the flow classifier.

The flow identifier is given by the RSVP in filter spec and session parameters. The filter spec consists of the source IP address and source port/flow label values. Session contains destination IP address, protocol id and destination port values. The information carried by the filter spec and the session parameters is given to the WFMP so that it can identify actual data packets belonging to the RSVP reserved flow. Using this information WFMP can route the data packet belonging to a specific RSVP flow to the correct RAN connection. It is assumed that the RSVP—mobile IP addressing problem is solved. The problem appears if a mobile terminal in a visiting network is identified by the care-of address and RSVP uses the home address. In such a case, the flow identifier given by the RSVP does not match to the identifier carried by the data packets. Thus, the packets belonging to the RSVP reserved flow can be neither identified nor routed to the correct radio flow.

Like the WFMP detected flow, RSVP flows are monitored by the flow classifier. Monitoring is needed to detect when the flow shall be released.

Another option is that RSVP explicitly releases the flow by sending a teardown message to the QoS manager module. QoS manager then informs the WFMP to release the flow from the AP. RFC2205 says the following: "Although it is not necessary to explicitly tear down an old reservation, we recommend that all end hosts send a teardown request as soon as an application finishes." Due to this uncertainty, it must be possible to release the flow either through RSVP signalling or due to time out (after expiry of an inactivity timer).

Handling of differentiated services packets in the flow mapping approach WFMP must be able to detect the requested IP type of service bits (DS field) in each IP flow and treat packets belonging to this flow according to the value carried in the DS field. Each DiffServ packet is handled separately and, in addition, flow detection/monitoring is performed for DiffServ packets to detect flows.

When WFMP receives a DiffServ packet that does not belong to a flow, WFMP reads the value of the DS field and selects the correct default flow e.g. (best effort/medium priority real-time traffic). WFMP has the knowledge how to map between the DS field values and the predefined RAN flows, i.e. default flows. This knowledge is configured statically in WFMP to minimise interactions with the QoS manager module, i.e. WFMP does not need to consult QoS module each time a DiffServ packet is received.

Flow Management at the M-Router 52

In this preferred embodiment, the M-Router is responsible for the flow detection and management of RAN flow identifiers. It also has an interface to the radio access network through which it can create and remove radio connections, and to QoS manager to retrieve QoS class and bandwidth estimates for new flows.

WFMP uses two tables for flow management: active flows table (AFT) and default flows table (DFT). The detailed structure of the tables is presented in FIG. 17. AFT is used to manage all the detected flows, whereas the DFT contains an entry for each registered mobile terminal. Default flows table makes it possible to route non-flow and DiffServ packets to the mobile terminals.

The active flows table has an entry for each detected flow. Depending on the flow type, the correct IP header values are stored in the AFT (for flow types and the corresponding parameters, see Chapter 0). In addition to the IP header values, the RAN flow identifier (RAN_ID) and the AP interface values are stored in the AFT. The idea is that once the flow type and the corresponding IP header values match, WFMP reads the RAN_ID and AP_if values from the table and forwards the packet to the correct RAN flow.

The default flows table is much simpler, it just contains the mobile terminal identifier (the mobile terminal IP address) and the RAN_ID and AP interface values. There is one RAN_ID value for each default flow; RAN_ID_1 for the BE traffic, RAN_ID_2 for the medium priority traffic and RAN_ID_3 for the high priority traffic. The values are selected by the WFMP during the mobile registration. If no entry from the AFT is found for an incoming IP packet, the packet is compared against the DFT. Once either the destination or the source IP address match to the mobile terminal identifier, WFMP reads the correct RAN_ID (RAN_ID_1 being the default choice) and AP interface values from the DFT and forwards the packet to the correct radio flow. In case the non-flow packet requires a specific handling, RAN_ID_2 or RAN_ID_3 is selected.

Flow Management in the Downlink

First, normal IP routing methods are applied and the incoming IP packet is routed to the correct IP application/interface. The following rules should be followed when routing the IP packets:
1. If the packet is addressed to the M-Router itself (e.g. ping), it is processed in a normal way
2. Separate RSVP control packets from the other IP packets (identified by the RSVP protocol number 46)
3. Packets addressed to mobile terminals are sent to the WFMP process.

Next, a detailed description of the WFMP operation is given.

WFMP needs to select the correct RAN connection for incoming IP packets. If the packet does not belong to a flow, WFMP just selects the correct best-effort channel and sends the packet to the SAR. In case the packet belongs to a detected flow, the packet is passed to the compression module which then sends the packet to the correct RAN connection. FIG. 18 clarifies the WFMP routing.

First, WFMP checks the flow information the incoming packet is carrying. It goes through the packet, including the extension headers, and saves all the relevant information. From the basic IPv6 header, source and destination IP addresses together with the flow label and traffic class (DS field) are saved. If the IP packet carries an ESP extension header (Encapsulating Security Payload), meaning IP encryption is used, the security index parameter (SPI) is saved. In case the packet does not carry the ESP extension header, and TCP/UDP header is found, WFMP saves the port information and the protocol identifier.

After saving the flow information, flow classifier is called for flow detection purposes. Flow classifier detects one of the following cases:
1. The flow has already been detected, so just the flow information is updated
2. No flow has been detected yet and just the flow information is updated
3. Flow detection algorithm decides to create a new flow, starting from this particular packet.

When a flow is detected WFMP allocates a new RAN flow identifier for the flow. Since no explicit QoS or traffic parameters are available, WFMP has to communicate with the QoS manager to get the missing information. When requesting the QoS class and bandwidth estimate, WFMP gives the flow identifier (information used for flow detection) and TCP/UDP port information (if available) together with some measured traffic characteristics to the QoS manager module. Using this information, QoS manager calculates the QoS class and bandwidth estimation for this flow.

After the QoS manager returns the QoS class and the estimated bandwidth, WFMP reserves the connection from the AP and informs the mobile terminal and the compression module of the new flow. Finally, WFMP updates the active flows table (AFT).

Next, WFMP starts routing the packet to the correct radio connection. In case the flow has been detected, the correct RAN_ID can be read from the active flows table (AFT). The correct RAN_ID is found by comparing the flow information (according to the flow type) and the flow type to the corresponding values in the AFT. When all these fields match, WFMP reads the RAN_ID and the M-Router interface from the AFT and forwards the packet to the compression module. When passing the packet to the compression module, also the RAN_ID must be given. After compressing the packet, the compression module sends the packet to the correct RAN connection (given by the WFMP).

If no entry from the AFT is found, the packet does not belong to a flow and is sent on one of the default channel. The correct default channel is found from the default flows table by comparing the destination IP address of the incoming packet to the mobile terminal_id values in the DFT. Each mobile terminal registered to the network has an entry in the DFT. Once the ids match (dst_addr=MT_id), flow classifier reads the corresponding RAN_ID (RAN_ID_1 if no special treatment required) and M-Router interface values from the DFT and sends the packet to the correct default channel. If the destination id does not match to any of the MT_id values in the DFT, the mobile is not registered to the network and the packet is discarded.

Flow Management in Uplink

When a packet is received from the radio access network, it is addressed either to a fixed host, or to another mobile terminal.

According to the RAN_ID, the SAR layer passes the received IP packet to the correct module. This is done automatically since there is a one-to-one relationship between each RAN connection and one of the modules (identified by the SAR SAP). The binding is done when the RAN connections are created. If the packet belongs to a flow and the destination is in the core network, the packet is passed to the compression module for decompression purposes (see FIG. 19). In case the packet is non-flow traffic it is passed directly to the WFMP process. If the packet is RSVP signalling it is sent for RSVP module, and so on.

The uplink WFMP processing is somewhat different from the downlink operation; WFMP receives only non-flow packets and 'flow' packets addressed to a fixed host. Therefore, the WFMP routing is much simpler compared to the downlink case.

The beginning is, however, similar to downlink operation, i.e. the flow information is saved and the packet is passed to flow classifier for flow detection purposes. The same three cases apply here: (1) flow already been detected, (2) flow not detected yet, or (3) new flow detected. If a new flow is detected, WFMP needs to select the new RAN_ID and request the QoS class and bandwidth estimation from the QoS manager. Then, WFMP informs the compression module of the new id. Also the AP and the mobile terminal must be informed of the new id, and a new service access point (SAP) added to the SAR interface. After the mobile terminal receives the flow information, it starts to use the new RAN_ID for all the packets belonging to that flow.

Option (1) always means that the correspondent node is located at the IP network. This is because mobile to mobile flows are switched directly between the AP interfaces. Options (2) and (3), on the other hand, require specific attention.

In both cases, WFMP has to detect mobile to mobile calls and forward the packet to the correct default channel. The correct default channel is found out by comparing the destination IP address to the values in the default flows table. In option (3), the packet is first sent on the default channel (best-effort) and only after that the flow is switched. If the destination is located at the IP network (not found from the DFT), the packet is sent to the IP forwarding process which forwards the packet to the correct network interface (normal IP routing applied).

Mobile to Mobile Traffic

The start is similar to uplink operation, that is the SAR first forwards the packet to the correct process depending on the RAN_ID.

In case of non-flow traffic, the SAR sends the packet to WFMP. Since the packet is addressed to another mobile terminal, WFMP finds an entry from the default flows table. Then it simply forwards the packet to the correct default channel (read from the DFT). MT-to-MT non-flow packets are always routed via the WFMP.

When the WFMP detects a new flow and the destination is another mobile terminal, WFMP creates a connection directly between the two mobile terminals. This means that WFMP selects new RAN_IDs for both AP links' (one for MT1, another for MT2), informs the receiving and sending MTs of the new ids and adds the new connections to both APs. The compression module is not informed since the compression is used between the MTs directly. Mobile to mobile routing case is clarified in FIG. 20.

First, the receiving mobile terminal is informed of the new RAN_ID. It then sends the acknowledgement back, meaning that the receiver is listening the new RAN_ID. Then, the new RAN_ID is given to the sending mobile terminal. The sending mobile terminal understands that the packets belonging to that flow must be compressed. It just starts using the new RAN_ID and applies the compression mechanism. Finally, the receiving mobile terminal receives the first packet carrying the full IP header. It must then save the header since the consecutive packets are compressed.

Since the detected MT-to-MT flows are not transmitted through the M-Router WFMP module, the WFMP cannot monitor the active flows. This means that it cannot detect when the flow should be released. Therefore, the receiving mobile terminal side has to control the traffic and inform the M-Router WFMP when a flow should be released. Possible monitoring places are the MT WFMP or MT FC modules. An optional solution is to monitor the traffic in the SAR block. The SAR block could measure the traffic going through the specific RAN connections (identified by the RAN_ID) and after a constant time of inactivity (time out) SAR would inform the WFMP to release the flow.

Flow Management at the Mobile Terminal

Flow management at the mobile terminal (MT) side is much simpler than in the M-Router side. The MT WFMP does not detect flows, it just starts using new radio connections when commanded by the M-Router WFMP.

Flow Management in Uplink

MT WFMP just needs to pass the IP packet to the correct RAN connection. Packets not belonging to a flow are sent on one of the default channels, packets belonging to flows to the correct radio channel according to the AFT (see FIG. 21) Like at the M-Router side, WFMP first updates the flow information (the same four flow types identified) and uses the correct parameters in reading the AFT. If the flow information and the flow type correspond to one of the AFT entries, the packet belongs to a flow. Otherwise, the correct default flow is read from the default flows table.

Flow Management in Downlink

The downlink case is also quite simple (See FIG. 22). WFMP does not need to do any routing between RAN channels, it just passes the received IP packet to the IP forwarding which finally delivers the packet to the correct application. Like at the M-Router side, the SAR already takes care of the routing by passing the incoming packet to the correct MT process.

Since the M-Router WFMP cannot monitor mobile to mobile flows (flows are switched directly between the M-Router AP interfaces, thus bypassing the M-Router WFMP), the MT WFMP has to monitor incoming flows. This means that when the MT WFMP notices that the flow does not exist anymore, it has to inform the M-Router WFMP to release the flow from the RAN.

There are several different mechanisms that could be applied in the WFMP flow detection to that described above. For example, the following ideas can be used if minimal processing load is required in the M-Router.

The simplest mechanism is based on IPv6 flow labels and X/Y classifier. WFMP just checks the flow label value, and if it is non-zero uses the source IP address and the flow label for flow detection. In case the flow label is zero, the packet is treated as best effort traffic and no flow classifier is applied (=no flows detected for packets having zero flow label).

Flow Compression Scheme

Header compression may be performed for IPv6 as described in the Internet draft on IP header compression by Degermark. The method for grouping IP datagrams into compressible streams discussed in the document will not be implemented. It is assumed that the WFMP module in the M router performs the grouping of the IP datagrams on behalf of the flow compression (FC) module.

Every terminal that enters the network is assigned a best effort (BE) channel. The datagrams sent on the BE channel are not compressed due to lack of similarity between individual datagrams. Whenever the M router's WFMP module identifies a new flow it sets up a new radio channel for that flow and the datagrams sent over the channel are compressed by the FC.

Whenever an IP datagram is sent either uplink or downlik, a check is made to see if it belongs to some flow. If the flow exists, the IP datagram is sent to the FC module, which performs the header compression and sends the compressed IP datagram via the assigned radio channel to its destination. If the datagram doesn't belong to any flow, it is sent uncompressed on the BE channel. Whenever a new flow is detected, a new radio channel is allocated and the FC is notified to set up the compression state and to direct the incoming datagrams from the radio flow to the FC. When the flow ends, the FC is notified so that it may deallocate memory reserved for bookkeeping purposes.

The header decompression is somewhat simpler than the compression. Whenever data is received from a BE channel, it is delivered directly to the WFMP. If the radio channel belongs to a flow, the data received is sent to the FC which uncompresses and forwards the IP datagram to the WFMP. When the flow ends, the FC is notified so that it may deallocate memory reserved for bookkeeping purposes.

Even if header compression is done on every non-BE channel it is possible to use direct point-to-point flows ("cut-through") between two terminals without going through the M router and its FC.

According to the draft proposed in Degermark, the packets are partitioned into two different categories, one for TCP and the other for non-TCP packets. The packets in each category are further divided into packet streams based on IP addresses, port numbers, etc., a task that is already performed by the WFMP software module in the M-Router. This partitioning between TCP and non-TCP packets together with a context identifier (CID) uniquely identifies which compressed and uncompressed packets belong to the same packet stream. The compression is done by sending only those header fields that change, or in the case of TCP by sending the change from the previous datagram. The draft examines which header fields may be inferred (e.g. packet length), which are constant, and which header fields have to be either sent as-is or as a difference from the previous.

Four new packet types are defined in addition to the normal IPv6(/v4) packets: The full header packet indicates an uncompressed packet that belongs to a compressible stream. It includes the context identifier (CID) and a generation for non-TCP packets coded into the length fields present in the packet header.

The compressed non-TCP packet includes the CID together with the generation and the fields that have changed since the previous full header packet, which is identified by the generation value.

The third type is the compressed TCP packet that " . . . indicates a packet with a compressed TCP header, containing a CID, a flag octet identifying what fields have changed, and the changed fields encoded as the difference from the previous value", i.e. the previous packet. The TCP checksum is also included in the packet.

The fourth type is the compressed TCP nodelta packet that is similar to the compressed TCP packet except that the header fields sent as the difference from the previous packet are sent as-is. This type of packet is only sent in response to a header request issued by the receiver.

These new packet types are indicated by sending a specific type value either on the link layer level or by adding an additional byte in front of the compressed packet. It is also assumed that the length of the packet is given by the link layer.

The compression is started by choosing a suitable CID value and sending a full header to the decompressor. Full headers are sent with an exponentially increasing period until an upper time or packet limit is reached. To recover as quickly as possible from TCP packet errors the decompressor may request the full headers for a set of TCP CIDs. The request is sent as a context state packet with a list of CIDs which won't decompress correctly which means that synchronization is lost between the compressor and the decompressor. The compressor replies with a new TCP nodelta packet for each CID requested.

Qos Management

QoS is a new trend in IP-networks. Formerly QoS has been realized by ATM, but increasing amount of IP applications (users) demanding QoS from the network, has forced network designers to pay attention to QoS in IP networks.

The present system is designed to take advantage of customer and core network's QoS mechanisms. Typically, Integrated services based mechanisms are seen as QoS mechanisms in the last hop of the network. Differentiated services based mechanisms are seen more as core network mechanisms. Both mechanisms have been considered in developing the present system. Also some other mechanisms to separate packets from others have been introduced.

General QoS Management Concept

In practice, QoS means differentiating classes of data service—offering network resources to higher-precedence service classes at the expense of lower precedence classes. QoS also means attempting to match the allocation of network resources to the characteristics of specific data flows [QoS]. These ideas are deployed in the present system.

QoS can be implemented by differentiating data flows in the basis of different information: IPv6 Flow-ID+source address+destination address, port information+source address+destination address, Priority bits+source address+destination address, RSVP reservations or H.323.

These flows can be treated differently from each others, and QoS can be implemented by multiplexing these flows in the basis of QoS parameters of each flow. These parameters can be explicit values (peak cell rate, bandwidth requirement etc.) or simply an information of preferred Class of Service. It depends on the mechanism how the QoS parameters are determined.

Packets belonging to a flow, are put to a proper radio queue. In the preferred embodiment of the present invention, there are three different queues: Best Effort, Controlled Load and Guaranteed Service. These flows get different priority from each others, and also scheduling inside the queues will be performed.

QoS Manager (QoS Entity)

QoS manager's main task is to map fixed network's QoS parameters to radio QoS and communicate with radio resource manager. In practice this means mapping explicit QoS values to radio priority queues. QoS manager has to know some statistics of flow, and proportion this to available radio bandwidth. With this information QoS manager can prioritize different flows.

QoS Manager has interfaces to RSVP, H.323 and WFMP entities (as explained above with reference to FIG. 15). These interfaces and main signals are presented in following table:

TABLE 4

QoS manager interfaces

| Interface | Signals |
|---|---|
| M-ROUTER_QoS -> | RESV_FLOW_conf |
| M-ROUTER_RSVP | RESV_FLOW_req |
| MT_QoS ->H.323 | SETUP_conf, CLOSE_conf, UPDATE_conf |
| H.323 ->MT_QoS | SETUP_req, CLOSE_req, UPDATE_req |
| M-ROUTER_QOS -> | RESERVE_FLOW_req |
| M-ROUTER_WFMP | RESERVE_FLOW_conf |
| M-ROUTER_WFMP -> M-ROUTER_QoS | RR_STATUS_enquiry |
| M-ROUTER_QOS -> | UPDATE_req |
| M-ROUTER_WFMP | UPDATE_conf |

M-Router's QoS manager has more functionality than the mobile terminal's QoS manager, because flow establishing is performed in M-Router. The most important functionalities of the mobile terminal's QoS manager is to assist H.323 signalling and handovers.

Active Flows Table

Active flows table is the place where all information concerning a data flow is stored. This table is accessible for WFMP and QoS Manager. As mentioned above, an active flows table is exemplified in FIG. 17. In addition to proposed Active Flows Table, QoS information also needs to be included in that table, together with an indication whether the flow is signalled or only detected by WFMP.

Ways to get QoS Information for a Connection

RSVP (FIG. 24)

RSVP is a resource reservation protocol, which tries to reserve bandwidth and desired QoS for a particular data flow. This system is readily supported in the present system, because flows are detected by WFMP, and flows can be treated differently from each others in radio link. RSVP uses control messages for marking reservations in intermediate network elements. These control messages are separate from application data. These messages are separated from other data in the basis of protocol number, and directed to RSVP entity before WFMP process.

Two different scenarios exist when using RSVP:

1. WFMP has already detected a flow, and created a dedicated channel for flow and after that RSVP entity gets reservation request for that particular flow.
2. RSVP entity gets reservation request before WFMP detects the flow. In this latter case RSVP should trigger WFMP. This can be done via QoS manager.

FIG. 24 shows how RSVP reservations are handled in the present system. This particular picture presents situation where MT is receiver and sender is somewhere in network (downlink case).

RSVP messages (PATH/RESV) use protocol number 46, and that is how reservation messages can be separated from best-effort traffic. These messages will be delivered to RSVP entity which handles them. RSVP entity talks with QoS manager which asks WFMP to establish flow with appropriate QoS values. WFMP asks resources from RRM, and QoS Manager doesn't have worry about this.

In Mobile IP Router, RSVP Entity has two roles, it acts like a normal RSVP Daemon, but also makes wireless specific operations. Normal RSVP Daemon checks the capacity of the Mobile Router itself, and forwards/manipulates RSVP-messages in IP level. Wireless RSVP Daemon communicates with WFMP and ask it to establish flows with certain parameters.

RSVP RESV messages can also be so called refresh messages, which are sent periodically. These messages shouldn't trigger a new flow, but only refresh the existing. This is done in M-ROUTER-WFMP in following way:

1. RESV refresh message triggers QoS manager to send RESERVE_FLOW req to WFMP.
2. WFMP checks from active flows table if it already has signalled flow for that particular dataflow. In the Active Flows table, there has to be an indication if the flow is signalled by RSVP or detected in some other basis (like traffic volume).
3 If flow already exists, WFMP only sends confirmation message, and makes no other actions.

Differentiated Services

Differentiated services means generally deployment of priority bits in every IP-header. If WFMP detects a flow of IP-packets with priority, it should inform QoS Manager about these bits. QoS Manager includes functionality that understands the bits, and makes a mapping to required Radio QoS. Pameters are marked to the Connection table for that specific flow.

How parameters are mapped into explicit QoS requirements, depends on deployed differentiated services in network side. When the formula of priority bits is ready, it's relevant to map the parameters into explicit Priority Classes. The standardisation of priority bits is still going, and there may be different ways to deploy priority bits in the future. Tables 5 and 6 exemplify how bits are mapped into priority classes in the preferred embodiment of the invention.

TABLE 5

Example of bit pattern

| Bits | Indication |
|---|---|
| Bits 0–2 | 000 = Drop Preference 1, 001 = DP 2, . . . , 111 = DP 8 |
| Bit 3 | 0 = Normal Delay, 1 = Low Delay |
| Bit 4 | 0 = Normal Throughput, 1 = High Throughput |
| Bit 5 | 0 = Normal Reliability, 1 = High Reliability |
| Bits 6–7 | Reserved for Future Use |

TABLE 6

Example of mapping Priority bits to QoS Classes

| Priority bits | QoS Class (see Table 8) |
|---|---|
| ???001?? | Class 3, BE |
| ???101?? | Class 2, Controlled Load |
| ???110?? | Class 1, Guaranteed Load |

If WFMP detects packets that include priority bits, but can't detect a flow from that traffic stream (not enough packets per second), WFMP puts these packets to the right priority queues. In other words, WFMP does not ask anything from QoS manager, if packets are only occasional. That is, the intelligence is split between WFMP and QoS-manager, so that the QoS—manager does not become over deployed.

Well Known Ports

There are many "well known" TCP/UDP ports, indicating that traffic needs some real time features, or it may also indicate that the amount of traffic is extra high or low. This kind of ports are e.g. ftp-port or telnet port, which both have very different characteristics. Ftp needs much bandwidth, but it isn't so critical with real time requirements. On the opposite, telnet doesn't need much bandwidth, but it shouldn't get affected by high delay. This information can be deployed when choosing the right radio link queue for the data flow. In Preferred system, it's relevant to take advantage of port information after a flow has already been detected. This means that port information itself doesn't trigger WFMP to notice a new flow, but after a flow has been detected, port information can be deployed. If IPSEC or some other protocol hides port information, then it can't be deployed.

FIG. 26 presents a situation, where WFMP has detected a flow and port number belongs to an applications that is identified by QoS Manager.

Table 7 includes some common ports that could be treated differently. Listing of ports is only an example, and the ports that get specified service, could be changed.

TABLE 7

Ports (Example)

| Type | Port number | Explanation | Possible QoS Classes (See Table 8) |
|---|---|---|---|
| ftp-data | 20/tcp | File Transfer [Default Data] | Class 3 |
| ftp-control | 21/tcp | File Transfer [Control] | Class 3 |
| telnet | 23/tcp | Telnet | Class 2 |

TABLE 7-continued

Ports (Example)

| Type | Port number | Explanation | Possible QoS Classes (See Table 8) |
| --- | --- | --- | --- |
| http | 80/tcp | World Wide Web HTTP | Class 2 |
| snmp | 161/tcp | SNMP | Class 3 |
| ipx | 213/tcp | IPX | Class 3 |
| dhcpv6-client | 546/tcp | DHCPv6 Client | Class 2 |
| dhcpv6 | 547/tcp | DHCPv6 Server | Class 2 |
| vat | 3456/tcp | VAT default data | Class 1 |
| Vat-control | 3457/tcp | VAT default control | Class 1 |

The network administrator is preferably able to configure ports that get special handling as it is desirable to configure the classification in the basis of what customer company needs. Some company may use multimedia applications much more aggressively than others. Also, some companies may use their own specific applications that should get most of the bandwidth (e.g. banks). This special treatment is possible, for example, if the QoS Manager is a separate functional entity that can be updated easily.

H.323

In the system of the present invention H.323 can be deployed in two different ways: 1) H.323 applications signal connections via the QoS manager, or 2) H.323 signals connections by using RSVP (FIG. 27). In both cases, there also has to be a mechanism to update the connection.

The H.323 call signalling procedures are made of five steps from call set-up to call termination. The call set-up procedures with all possible cases are complex and are only briefly outlined below.

Firstly, a SETUP message is sent from the calling endpoint to the other party which responds with a CONNECT message. Next, both parties exchange system capabilities by transmission of the H.245 TERMINAL-CAPABILITY-SET message. During the third phase logical channels for the various information streams are opened using H.245. These streams are transported over an unreliable protocol specified by H.225.0. Data communications which is transmitted in the logical channels set-up in H.245, are transported using a reliable protocol (H.225.0). During a session, the procedures for changing capability, receive mode etc. are specified in H.245.

The bandwidth required for the connection can be determined from the capabilities that are agreed to be used between the terminals with a table that maps the audio codec selected to the bit rate required by the codec. For video codec, the maximum allowed bit rate is included in the capability set message per available video codec.

Finally, the call is terminated by either of the parties with an END-SESSION-COMMAND in the H.245 control channel. The other party responds with a RELEASE-COMPLETE message.

The interface from the H.323 protocol stack to the QoS manager requires three functions to facilitate the above mentioned functionality with H.323. The required bandwidth with information about the parties (source & destination address) must be passed to the QoS manager after the call set-up phase. If the required bandwidth between the parties is changed during a call it must be signalled to the QoS manager as well with an update request stating the new bandwidth and identification information for this connection so that the QoS manager can identify which connection's bandwidth it has to modify. Finally, after the call is terminated the bandwidth must be released by signalling the QoS manager that this connection has been terminated.

RAN QoS Functions.

The QoS based radio access network has to be able to provide bandwidth on demand, class based queuing and reliability. In a wireless transmission link multiplexing of different services into the medium typically requires consideration on four QoS accounts: bandwidth, delay, jitter, and reliability.

Bandwidth is the first requirement for QoS driven services i.e. to be able to support the requested traffic parameters. In the wireless link the main objectives are efficient channel utilisation while maintaining service specific QoS for TCP/IP traffic. This means that the AP Scheduler should know the requested average and/or peak bandwidth of those connections for which the radio flow is to be established. This way the Scheduler can guarantee the satisfaction of bandwidth on demand and perform statistical multiplexing.

Delay and Jitter are primarily affected by the traffic scheduling over the wireless link. In the present approach the flow based connections are queued separately (queue for each connection) and connections are grouped into 3 different delay class queues. In order to be able to put the packets to the right queue, the Scheduler (or queuing function) needs to know the flow ID and delay class of the incoming packet. Also, to take the delay and jitter requirements into account in choosing the packets to be sent, the Scheduler should know a) maximum allowed delay of the packets at RAN layer b) keep a time stamp for each packet.

Reliability over wireless link requires error control which is typically given for instance by coding and/or data retransmissions. Coding is used both for the error detection and correction which imposes constant overhead over the applied data. ARQ (Automatic Retransmission reQuest) is only applied for the corrupted packets which is feasible as long as the packet loss probability is not too high and delay of retransmission is admissible. The scheduler needs information about ARQ usage per radio flow (connection) basis. (e.g. No ARQ, Limited ARQ, ARQ). FEC usage can be fixed, used for all packets.

Table 8 presents an example of mapping from TCP/IP QoS into the radio access network specific QoS according to a preferred embodiment of the present invention. The first two columns specify radio access queuing and error control while columns 3–5 show different TCP/IP level QoS concepts.

TABLE 8

Example of network QoS mapping into radio access QoS.

| Delay Class | Radio Access QoS | Transmission Protocol | Integrated Services | Differentiated Services |
| --- | --- | --- | --- | --- |
| 1st class | No ARQ + FEC | — | Guaranteed Load | low delay/high dropping |
| 2nd class | Limited ARQ + FEC | UDP/RTP flow | Controlled Load | medium delay/medium dropping |
| 3rd class | ARQ + FEC | TCP flow/No Flow | Best Effort | high delay/low dropping |

The radio link schedules the packets belonging to various queues (also called radio QoS classes or delay classes) differently thus meeting the varying delay requirements.

In one embodiment relating to radio flows, the M-Router functions as a central intelligence point of the radio access network detecting flows, classifying them and mapping network QoS concepts into radio QoS capabilities. An alternative embodiment utilises direct QoS Mapping. In this approach the access point may handle IP packets, check the QoS bits of each header and to map the IP packet into the corresponding radio scheduling queue.

Queuing (See FIG. 28): Queuing strategy for priority classes 1 and 2, in the preferred embodiment, is based on the radio flows such that each radio flow has its own queue. Based on the flow ID, the right priority class can be chosen as well as the queue where the packet is put. This approach is required because the Scheduler has to be able to differentiate the connections and their QoS requirements. For Best Effort data (priority class 3), the flows may also be identified.

Delay and Jitter: These are primarily affected by the error protection scheme and traffic scheduling over the wireless link. It has been found that adding one more queue improves the service quality that can be provided for Internet voice, thus increasing the service differentiation capability.

Scheduler

The wireless environment puts a special stress also on the performance of the scheduling algorithm. This requires a scheduling algorithm that is efficient and aware of QoS and traffic characteristics of the connections.

The scheduling algorithm has an important role in controlling the flow of the packets over the band-limited wireless channel. Used together with Call Admission Control (CAC) and resource allocation, the scheduling can be used to guarantee the satisfaction of different QoS requirements for different traffic types. Admission Control and resource allocation operate at the time of the connection is established, deciding whether new radio flows/connections can access to the channel. The scheduling makes the decision on choosing the packets to each MAC frame. The scheduling algorithm should aim to provide the following properties: [Garrett 96]

Maintenance of traffic characteristics of the connections

QoS requirements satisfaction—the QoS parameters related to delay and loss are important to maintain according to the traffic contract.

Statistical multiplexing gain—the scheduling should smooth or take into account the effect the connections with variable bit rate have on the buffer occupancy (congestion).

Utilization of bandwidth unallocated or allocated to idle connections—since the applications (WWW-browser for instance) may be not sending cells all the time, being silent, the unallocated resources should be utilized during these periods.

Declared and real traffic consistency—in the case where the source is producing more traffic than it's expected and thus breaking the traffic contract, the scheduler should for instance 'drop' the priority of the connection.

With the queuing scheme of the preferred embodiment, the Scheduler could work for instance in the following way:

Firstly, the Scheduler prioritizes the packets according to the three priority classes. Class 1 has highest priority and class 3 has the lowest priority.

Scheduler begins to allocate packets pending in the class 1 queues. Inside the priority class, the prioritising between packets/flows can be made according to delay requirements i.e choosing packet who have least 'lifetime' left and so forth. Parallel to this the flows consuming less bandwidth than allocated have higher priority. This can be taken into account by using traffic policing function such as Token Bucket. When all the packets of the priority class 1 have been allocated and there's still room in the MAC frame, the Scheduler begins to allocate packets from priority class 2 queues in the same way as in the class 1 case. After all the class 2 packets have been allocated, the Scheduler allocates class 3 packets into the free slots. Class 3 queue works as a FIFO (First In, First Out). The scheduling ends when all the packets have been allocated or when the MAC Time Frame is full.

Mobility Management

Terminal Registration and Authentication

The terminal performs the IP level registration process when it has been powered on. It is also the initial part of an IP level handover. The process is the same in the terminal's home network and in the foreign networks.

The process is performed after the link level registration process. The link level procedures have already authenticated the terminal and accepted its access to the network. The link level entities have also made the terminal a member of the all-nodes and solicited-node multicast groups. The solicited-node multicast address is calculated from the EUI-64 identifier provided with the link level registration messages.

These multicast groups are local to the link that the terminal is currently attached to. This means that both the terminal and the M-Router know that this terminal belongs to these multicast groups. The M-Router knows to route packets that are addressed to these groups to this terminal and the terminal is able to receive and process these packets. This is why the terminal does not perform an explicit join to these groups, using the link level multicast membership protocol in the beginning of the IP level registration process after it has generated its link-local IP address.

When the link level has performed its registration procedures the link level informs the upper level entities of its readiness. If this is a power on situation the network interface in the terminal becomes into an enabled state. In this case the terminal generates its link-local IP address from the information provided by the link level (an EUI-64 formatted MAC identifier of the interface). Normally a host would validate this address by performing duplicate address detection procedures before the final assignment of the address. However, the MAC identifier has already been verified during the link level registration procedures so there is no need to carry out this verification again as the link-local IP address is generated from that same unique identifier. The terminal assigns the link-local IP address to the network interface.

The following actions are performed in both power on situation and in case of IP level hand over. The host would normally use link level mechanisms to join now to the all-nodes and the solicited-node multicast groups. For the reasons mentioned above this task is not performed in this environment at this point since the task has been carried out implicitly during the link level registration procedure.

Once the network interface has been assigned a valid link-local IP address the terminal performs Router Discovery actions in order to find its default router and possibly to get the network prefixes for its site-local and global IP addresses. The M-Router answers to the terminal's solicitation by an advertisement and provides the terminal with information on M-Routers link level address as well as its IP address. The terminal updates its default route to point to this address. Note that the Router Discovery process is necessary even in the home network because the home network prefixes might have been renumbered.

The router may advertise the site-local and global IP address prefixes for this link in the advertisement. If this is the case the terminal generates its site-local and global IP addresses based on these prefixes. Again, the terminal does not need to verify the uniqueness of the addresses by duplicate address detection procedures since the network interface specific suffix of the addresses has already been proven to be unique during the link level registration process. Also, in this case the terminal will probably not need to join to the solicited-node groups of these addresses as these groups are potentially the same as the solicited-node group for the link-local address of this network interface. The terminal assigns its site-local and global IP addresses to the interface.

The bits in the Router Advertisement may also be set so that the terminal is required to acquire its site-local and global IP addresses by stateful configuration mechanism such as DHCPv6. In that case the terminal sends a solicitation to the all configuration servers group on the link in order to find a server that is willing to serve the terminal. In this environment the server would reside in the M-Router. The server responses with an advertisement so that the terminal would know the IP address of the server. The terminal sends a configuration request to this address and receives the requested addresses in the servers reply. The configuration server would probably add the terminal into the solicited-node groups of these addresses on behalf of the terminal. Otherwise the terminal would have to initiate the generic link level and IP level multicast group membership procedures in order to join to these groups. In any case the terminal must enable the receiving of the packets coming from the interface and addressed to these solicited-node groups. The addresses need not to be verified by the duplicate address detection procedures, the configuration server and the other entities within the M-Router are supposed to know which addresses are valid for the terminal's interface. The terminal assigns its site-local and global IP addresses to the interface.

The stateful configuration mechanism can be optimized further by leaving out the DHCP Solicit and the DHCP Advertise messages. They are not needed if we assume that the stateful configuration server is located in the M-Router, whose address we know already from the Router Discovery process. This would be a non-standard deviation from the stateful configuration mechanisms and may not go in hand with the proposed IP level authentication methods.

Addressing Scheme

IP level addresses are constructed based on the standard address configuration methods. The network interface specific part of the IP addresses is formed from the link level MAC identifier of that interface. The identifier is in the EUI-64 format. This identifier is verified during the link level registration process and is proven to be unique among all the terminals that are attached to the same subnet. If the verification fails the terminal is not able to use the network.

The terminal's specific network interface's link-local IP address is generated from a static well-known prefix and the network interface identifier. The link-local address is not verified by the Duplicate Address Detection process.

The network interface's site-local IP address is formed from the site-local prefix received in the Router Advertisement and from the network interface identifier. The site-local prefix uniquely identifies this subnet within the site area. The site-local address may also be acquired from the stateful configuration server. In both cases the generated or received address is assumed to be valid and no Duplicate Address Detection is performed.

The network interface's global IP address is either generated from the global prefix provided by the Router Discovery process and from the network interface identifier. The global address may also be received from the stateful configuration server. The global address is not verified by the Duplicate Address Detection process.

The information in the M-Router that is used in the terminals' address allocation process (either stateless or stateful) is managed by methods that are outside the scope of this document. It is also assumed that the terminals are attached to just one link at a time so that only one M-Router is accessible at a time. The addressing scheme deviates from the standard procedures by the fact that no Duplicate Address Detection is performed.

Location Management (RAN+IP)

When the terminal has moved to another subnet the link level performs its registration procedures. The IP level is informed about this by the link level as described above (Terminal Registration and Authentication) after which the IP level performs its own registration procedures as described in the same section. The IP level mobility deviates from the standard with the fact that an indication is received from the lower layer each time the subnetwork changes.

Although the potential subnetwork change has been indicated by the link level to the IP level, the ultimate fact that the terminal has moved to another subnet is deducted from the site-local and global address prefixes acquired from the Router Advertisements or from the site-local and global addresses received from the stateful configuration server. These new prefixes are compared to the old ones that were active on this network interface before the movement. If the prefixes differ the IP mobility procedures must be activated.

The terminal uses a special header extension in the terminal originated packets when the terminal is away from its home network. The header extension is called the Home Address option. The Home Address option contains the home address of the terminal's network interface. This option makes it possible for the terminal to use its new global address in the packets' source address field so that the packets can more easily penetrate the firewalls along the path. The Home Address option is handled by the receiving nodes so that the source address of the received packet is replaced with the address in the Home Address option. This way the ongoing sessions are not disturbed even when the active address of the terminal is changing.

The terminal informs its previous default router of its new global IP address by sending a Binding Update to the router. The message is authenticated with the IPSEC AH header. The previous router acknowledges the update. The previous router becomes a proxy for the terminal's previous global address. This means that the previous router captures all the packets that are destined to the terminal's old global address and encapsulates each of them into a new packet and sends it to the terminal's new global address. The previous router also disables the allocation of the terminal's old address for the other terminals under its area until the Binding Update expires. When the Binding Update expires the previous router will no longer act as a proxy for the terminal's old global address.

The terminal also informs the router in its home network of the terminal's new global IP address. This is performed by the same Binding Update+AH/Binding Acknowledge+AH transaction as before. The home router now acts just as the previous router in the previous case. The only difference is that the terminal sends Binding Updates regularly to the home router so that the Binding Update never expires.

The terminal informs also all the corresponding nodes it has recently been communicating with of its new location. Again it uses the Binding Update+AH message. The corresponding nodes update their data structures so that a Routing Header is added to each packet that is destined to the terminal's home address. The Routing Header contains the new global address of the terminal's interface. This makes the packet to be routed first to the new location of the terminal. There the Routing Header is removed and the packet appears as if it had arrived to the terminal interface's home address. As the home address is still a valid address of the terminal's interface, the packet can be received and processed as if the terminal was in its home network.

Inter IP Subnetwork Handover within Router

This means the case when the terminal moves between router ports which belong to different IP domains. Here, mobile IP allocates new address but flows can be maintained in RAN. In the IP level this kind of handover is performed exactly the same as in the previous case.

When a host wishes to acquire a global Ipv6 address and has received a router advertisement with the M bit set, the host has to follow the principles of stateful address autoconfiguration, i.e. DHCPv6.

The stateful address autoconfiguration starts with the host, i.e. the client, sending a DHCP solicit message to the all DHCP agents multicast address in order to find one of the site's DHCP servers. The DHCP server replies with a unicast DHCP advertise message that contains the server's IP address. Thereafter the client sends a DHCP request to the server in order to obtain the network's parameters. The server responds with a DHCP reply wherein a variable amount of parameters are delivered to the client. The client may end the DHCP session by sending a DHCP release message to the server which then acknowledges the release by sending a DHCP reply. The server may also notify the client if some parameters change by sending an DHCP reconfigure message.

The advertise, request, reply, release and reconfigure DHCP messages are all unicast messages and may be followed by a variable amount of extensions that carry additional parameters between the client and the server. In addition to configuring the client's IP address and DNS entries the extensions include information about time zones, TCP parameters and other network information. The DHCP messages may also be authenticated.

The server and the client don't have to be on the same link, a DHCP relay server may be inserted between them to provide a larger domain served by only one DHCP server.

The DCHP server may attach an client key selection extension to its advertise message to indicate which security parameter index (SPI) value the client should use when authenticating itself to the server. The authentication is accomplished by adding a client-server authentication extension to any DHCP message. The purpose of the DHCP authentication extension is to provide authentication in the case that the client does not have large enough address scope to reach the server from the beginning, i.e. a DHCP relay is used and therefore the normal IPSEC procedures can't be applied. The current draft assumes that the key used for authentication has to be known by both the client and the server before the DHCP registration procedure.

DHCP v6 in Subnets

When DHCP is used to create the global IPv6 address it is very likely that the M router doesn't know the newly created global IPv6 address if the M router and DHCP server are separate entities. The DHCP server has given away an IPv6 address with the correct network prefix to the terminal which implies that the M router will sooner or later receive IPv6 datagrams destined to this address. In order to send the datagrams to the correct terminal via the correct VPI/VCI connection, the M router has to perform address resolution according to the neighbour discovery protocol [Narten98]. The M router simply sends a multicast neighbour solicitation on the link, and receives the link layer address in the neighbour advertisement sent in response by the terminal that has acquired the IPv6 address in question. The M router may thereafter send the datagram via the correct connection and add the global IPv6 address to its lookup tables.

Interoperation of RSVP with Mobile IPv6

In Mobile IPv6 a Mobile terminal (MT), which is visiting a foreign link, can be addressed either using its Home Address (HA) or using some of its care-of addresses (CoAs). Furthermore, if a Correspondent Node (CN) directs packets to the MT's HA (or to a stale CoA), the packets are tunnelled to the MT via the Home Agent (or a router at a previously visited link).

The various modes of addressing the MT raise issues of interoperability in a Mobile IPv6 environment, where RSVP ([RFC2205], [RFC2209]) is used for network resource reservation. The addressing modes must be taken into account when composing and transmitting RSVP messages,
setting up the reservation state in the network nodes,
classifying packets when implementing the traffic control, and
consulting routing process for finding out outgoing interfaces and becoming notified of route changes For conveying addressing information in RSVP messages and maintaining reservation state at the network nodes two options can be identified:

1) The MT is Always Identified by its Home Address in RSVP Messages

This straightforward approach stems from the idea that a RSVP PATH message originated by the sender application (which only knows the MT by its HA) would not be changed on its way to the receiver. This means that RSVP state at all nodes would need to be enhanced to encompass at least two addresses for the MT: the HA and a CoA. This means that the nodes have to be informed of the address binding. The HA is needed for identifying the RSVP session when trying to find a matching path state for a RESV message. On the other hand, CoA would be used for packet classification (if any) and consultation with the routing process.

This approach would necessitate changes to all RSVP-aware routers. It would also violate the wording in the current specification, which requires that the destination IP address of a PATH message must be the same as the DestAddress of the session ([RFC2205] p. 36).

2) The MT is Identified by its CoA in RSVP Messages when the MT is not at Home

As far as forwarding of application traffic is concerned, in Mobile IPv6 intermediate routers need not be aware of the binding between HA and CoA, except for the case of a Home Agent that is tunnelling packets to the MT. The same principle can be also applied to RSVP operation. This is facilitated by the observation that at the routers RSVP reservation state need not be maintained across the whole life span of an RSVP session. Instead, when the MT is roaming, a new path state can be built along the data path for each new CoA without any knowledge of the actual HA. This approach is more scaleable as it necessitates changes only at the end systems, while RSVP processing at the intermediate routers remains as specified in current RSVP RFCs.

To achieve smooth roaming, several message processing extensions and enhancements are required at the MT and the CN. These incorporate IP address mapping between HA and CoA with the support of IPv6 address configuration mechanisms and Binding Cache management.

Option 2) above would seem to be more feasible in operational networks having several core network routers. However, In the present system, any deviations from standard RSVP behaviour cannot be expected at the fixed network nodes. Therefore, option 1) has to be exploited with the assumption that the MT and the M-Router, which know the bindings between CoA and HA, are the only RSVP-aware nodes on the path between MT and CN.

SUMMARY

The complete system described in the preferred embodiment is based on IPv6 or IPv4 network architecture in which the IP packets with time-critical data are mapped into the high priority radio scheduling queues, and in which non real-time traffic is assigned to low priority queues. The mechanism described allows the user/applications to assign different network levels, here IP QoS parameters for various connection types over the radio link. The radio link QoS management described supports both integrated and differentiated service based IP QoS mechanisms.

However, as will be appreciated by a person skilled in the art, not all the components of this system are essential to the invention: some features are not required at all, whilst others are only exemplary and thus may be modified.

The present invention resides in the provision of a system which supports differentiated services. That is, a system which has a plurality of radio scheduling queues or radio flows with different delay and radio QoS characteristics. The solution described allows the operator and/or the manufacturer of the network to define the mapping between the fixed IP (DS fields) and radio QoS according to the desired flow policy of the particular network. For example, he can dynamically configure the flow class criteria (e.g. how many similar packets will be needed for detecting a flow) and assign his own policy which defines how the differentiation bits are mapped into the default queues.

In the preferred embodiment, the system has three radio scheduling queues, high priority service queue for premium class traffic, medium priority service queue for assured class traffic and low priority service queue for best effort class traffic, and each priority queue has various radio scheduling parameters which define these QoS. However, it will be appreciated that the number of default channels depends on the network requirements, and may alternatively be more or less than three.

As indicated above, differentiated services generally means deployment of priority bits in every IP header. In the preferred embodiment, Tables 1 and 2 illustrate priority class bit mapping which could be employed in an IPv6 header. The standardisation of priority bits has not yet been effected, and it would be clear to a person skilled in the art how this concept could be adapted to be used in a different header (for example the TOS octet of the header defined in IPv4 or one defined in a future standard).

Also, in the preferred embodiment, the network entity (M-router 52/access point 51/mobile terminal 4) process the IP type of service field and categorise the different packets into one of the default radio queues. The packet is marked with the flow specific RAN identifier if the IP service mapping is performed in the router. Then, the mobile terminal/access point decodes the RAN identifier and maps the packet into the corresponding radio flow. Alternatively, the access point can perform a direct QoS mapping from the IP W packet header to the radio queue. However, performance of these functions is not restricted to these components. For example, the mapping could be performed in the access point controller, or even a single access point if it included an IP packet handler.

Moreover the flow classification used in the preferred embodiment to detect an IP flow is not essential to the invention. If IP flow detection is required, then various other criteria can be used. For example, the flow classifier can be dynamically configured by changing the value of the packets/sec detection criteria parameter.

The present invention includes any novel feature or combination of features disclosed herein either explicitly or any generalisation thereof irrespective of whether or not it relates to the claimed invention or mitigates any or all of the problems addressed.

In view of the foregoing description it would be evident to a person skilled in the art that various modifications may be made within the scope of the invention.

What is claimed is:

1. A method for supporting the quality of service in packet data transmission in a radio network, whereby transmission over the air interface is in radio flows, the method comprising:
   selecting a radio flow having appropriate quality of service characteristics for the packet to be transmitted over the air interface from a selection of predefined default radio flows having different quality of service characteristics.

2. A method as claimed in claim 1, wherein selecting the radio flow comprising providing the packet to be transmitted with a radio flow identifier selected from predefined default radio flow identifiers representative of different quality of service characteristics.

3. A method as claimed in claim 2, further comprising mapping the packet into the identified default radio flow for transmission over the air interface.

4. A method as claimed in claim 3, comprising:
   detecting handover of a mobile communications device having an active connection from one radio subnetwork to another;
   performing default radio flow selection for the active connection in response to handover detection.

5. A method as claimed in claim 3, comprising:
   monitoring packets to be transmitted over the air interface to detect IP flows;
   switching a detected IP flow to a dedicated radio flow having corresponding quality of service characteristics.

6. A method as claimed in claim 2, comprising:
   detecting handover of a mobile communications device having an active connection from one radio subnetwork to another;
   performing default radio flow selection for the active connection in response to handover detection.

7. A method as claimed in claim 2, comprising:
   monitoring packets to be transmitted over the air interface to detect IP flows;

switching a detected IP flow to a dedicated radio flow having corresponding quality of service characteristics.

8. A method as claimed in claim 1, comprising:
detecting handover of a mobile communications device having an active connection from one radio subnetwork to another;
performing default radio flow selection for the active connection in response to handover detection.

9. A method as claimed in claim 1, comprising:
monitoring packets to be transmitted over the air interface to detect IP flows;
switching a detected IP flow to a dedicated radio flow having corresponding quality of service characteristics.

10. A method as claimed in claim 9, wherein switching the detecting IP flow to a dedicated radio flow comprises:
providing the packets of a detected IP flow with an identifier of the dedicated radio flow; and
mapping the packets of the detected IP flow into the identified dedicated radio flow for transmission over the air interface.

11. A radio access system for supporting the quality of service in data packet transmission over the air interface, the system comprising:
a selection of predefined default radio flows having different quality of service characteristics; and
means for selecting a radio flow having appropriate quality of service characteristics for the packet to be transmitted over the air interface from the selection.

12. A system as claimed in claim 11, wherein the radio flow selecting means comprises:
means for providing the packet to be transmitted with a radio flow identifier selected from identifiers corresponding to the predefined default radio flows.

13. A system as claimed in claim 12, further comprising means for mapping the packet into the identified default radio flow for transmission over the air interface.

14. A system as claimed in claim 13, further comprising means for detecting handover of a mobile communications device having an active connection from one radio subnetwork to another; and wherein the selection means selects a default radio flow for the active connection in response to handover detection.

15. A system as claimed in claim 13, further comprising:
means for monitoring packets to be transmitted over the air interface to detect IP flows;
means for switching a detected IP flow to a dedicated radio flow having corresponding quality of service characteristics.

16. A system as claimed in claim 12, further comprising means for detecting handover of a mobile communications device having an active connection from one radio subnetwork to another; and wherein the selection means selects a default radio flow for the active connection in response to handover detection.

17. A system as claimed in claim 12, further comprising:
means for monitoring packets to be transmitted over the air interface to detect IP flows;
means for switching a detected IP flow to a dedicated radio flow having corresponding quality of service characteristics.

18. A system as claimed in claim 11, further comprising means for detecting handover of a mobile communications device having an active connection from one radio subnetwork to another; and wherein the selection means selects a default radio flow for the active connection in response to handover detection.

19. A system as claimed in claim 18, further comprising:
means for monitoring packets to be transmitted over the air interface to detect IP flows;
means for switching a detected IP flow to a dedicated radio flow having corresponding quality of service characteristics.

20. A system as claimed in claim 11, further comprising:
means for monitoring packets to be transmitted over the air interface to detect IP flows;
means for switching a detected IP flow to a dedicated radio flow having corresponding quality of service characteristics.

21. A system as claimed in claim 20, wherein the switching means comprises:
means for providing the packets of a detected IP flow with an identifier of the dedicated radio flow; and
means for mapping the packets of the detected IP flow into the identified dedicated radio flow for transmission over the air interface.

22. A communication device for use in a system which supports the quality of service in data packet transmission over the air interface and comprises a selection of predefined default radio flows having different quality of service characteristics, wherein the device is arranged to select a default radio flow having appropriate quality of service characteristics for the packet to be transmitted over the air interface from the selection.

23. A device as claimed in claim 22, which is a mobile communication device or a mobile router.

24. A device as claimed in claim 23, wherein the system further comprises means for providing the packet to be transmitted with a radio flow identifier selected from identifiers corresponding to the predefined default radio flows.

25. A device as claimed in claim 23, wherein the system further comprises means for detecting handover of a mobile communications device having an active connection from one radio subnetwork to another; and wherein the device selects a default radio flow for the active connection in response to handover detection.

26. A device as claimed in claim 23, wherein the system further comprises means for monitoring packets to be transmitted over the air interface to detect IP flows; and
means for switching a detected IP flow to a dedicated radio flow having corresponding quality of service characteristics.

27. A device as claimed in claim 26, wherein the device comprises means for providing the packets of a detected IP flow with an identifier of the dedicated radio flow; and
means for mapping the packets of the detected IP flow into the identified dedicated radio flow for transmission over the air interface.

28. A device as claimed in claim 22, wherein the system further comprises means for providing the packet to be transmitted with a radio flow identifier selected from identifiers corresponding to the predefined default radio flows.

29. A device as claimed in claim 28, wherein the system further comprises means for mapping the packet into the identified default radio flow for transmission over the air interface.

30. A device as claimed in claim 28, wherein the system further comprises means for mapping the packet into the identified default radio flow for transmission over the air interface.

31. A device as claimed in claim 22, wherein the system further comprises means for detecting handover of a mobile communications device having an active connection from one radio subnetwork to another; and wherein the device selects a default radio flow for the active connection in response to handover detection.

32. A device as claimed in claim 22, wherein the system further comprises means for monitoring packets to be transmitted over the air interface to detect IP flows; and means for switching a detected IP flow to a dedicated radio flow having corresponding quality of service characteristics.

33. A device as claimed in claim 32, wherein the device comprises means for providing the packets of a detected IP flow with an identifier of the dedicated radio flow; and means for mapping the packets of the detected IP flow into the identified dedicated radio flow for transmission over the air interface.

34. A method for supporting the quality of service in packet data transmission in a radio network, whereby transmission over the air interface is based on packet scheduling, the method comprising:

selecting a radio scheduling queue having appropriate quality of service characteristics for the packet to be transmitted over the air interface from a selection of default radio scheduling queues having different quality of service characteristics, wherein the radio scheduling queues may be either aggregated in the air interface or identified separately in the air interface with the aid of queue or connection specific radio flow identifiers.

35. A radio access system for supporting the quality of service in data packet transmission over the air interface, the system comprising:

a selection of default radio scheduling queues having different quality of service characteristics and being either aggregated in the air interface or identified separately in the air interface with the aid of queue or connection specific radio flow identifiers; and means for selecting a radio scheduling queue having appropriate quality of service characteristics for the packet to be transmitted over the air interface from the selection.

36. A communication device for use in a system which supports the quality of service in data packet transmission over the air interface and comprises a selection of default radio scheduling queues having different quality of service characteristics and being either aggregated in the air interface or identified separately in the air interface with the aid of queue or connection specific radio flow identifiers, wherein the device is arranged to select a default radio scheduling queue having appropriate quality of service characteristics for the packet to be transmitted over the air interface from the selection.

* * * * *